United States Patent
Jiang et al.

(10) Patent No.: US 11,194,013 B2
(45) Date of Patent: Dec. 7, 2021

(54) POSITIONING APPARATUS, METHOD, MOBILE NODE AND WIRELESS COMMUNICATION APPARATUS

(71) Applicant: Sony Corporation, Tokyo (JP)

(72) Inventors: Nanlan Jiang, Nanjing (CN); Pingping Xu, Nanjing (CN); Pen-shun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 512 days.

(21) Appl. No.: 16/316,046

(22) PCT Filed: Jul. 25, 2017

(86) PCT No.: PCT/CN2017/094238
§ 371 (c)(1),
(2) Date: Jan. 8, 2019

(87) PCT Pub. No.: WO2018/028424
PCT Pub. Date: Feb. 15, 2018

(65) Prior Publication Data
US 2021/0286041 A1 Sep. 16, 2021

(30) Foreign Application Priority Data
Aug. 8, 2016 (CN) .......................... 201610643379.7

(51) Int. Cl.
*G01S 5/10* (2006.01)
*H04W 64/00* (2009.01)
(Continued)

(52) U.S. Cl.
CPC .............. *G01S 5/10* (2013.01); *H04W 4/025* (2013.01); *H04W 4/44* (2018.02); *H04W 64/006* (2013.01)

(58) Field of Classification Search
CPC ....... H04W 4/029; H04W 4/02; H04W 4/025; H04W 4/33; H04W 64/003; H04W 40/20; H04W 56/006; H04W 64/00; H04W 88/02
See application file for complete search history.

(56) References Cited

U.S. PATENT DOCUMENTS

| | | | | |
|---|---|---|---|---|
| 2010/0074133 | A1* | 3/2010 | Kim | H04J 3/0682 370/252 |
| 2016/0134717 | A1* | 5/2016 | McNeill | H04W 4/021 709/217 |
| 2016/0255603 | A1* | 9/2016 | Venkatraman | G01R 29/10 455/456.1 |

FOREIGN PATENT DOCUMENTS

| | | |
|---|---|---|
| CN | 103517204 A | 1/2014 |
| CN | 103517206 A | 1/2014 |

(Continued)

OTHER PUBLICATIONS

Aiping et al., "A Distributed Localization Scheme for Wireless Sensor Networks Based on Bounding Box Algorithm", [C]. 9th International Conference on Electronic Measurement and Instruments (ICEMI 2009), Beijing, 2009, pp. 2984-2988. (Abstract Only).

(Continued)

*Primary Examiner* — Kwasi Karikari
(74) *Attorney, Agent, or Firm* — Xsensus LLP

(57) ABSTRACT

Provided by the present disclosure are a positioning apparatus for positioning a mobile node in a wireless communication system, a mobile node, a wireless communication apparatus and a positioning method. The positioning apparatus comprises: a processing circuit, configured to determine position information of a mobile node on the basis of ranging information determined by a neighboring node of the mobile node in response to ranging requests sent mul- (Continued)

tiple times by the mobile node and position information of the neighboring node, the ranging information comprising a ranging result which is determined by the neighboring node for each ranging request of the mobile node. The positioning apparatus, mobile node, wireless communication apparatus and positioning method according to the present disclosure may effectively suppress the occurrence of an image error, thereby improving positioning accuracy.

17 Claims, 14 Drawing Sheets

(51) Int. Cl.
*H04W 4/02* (2018.01)
*H04W 4/44* (2018.01)

(56) References Cited

FOREIGN PATENT DOCUMENTS

| | | |
|---|---|---|
| CN | 105025443 A | 11/2015 |
| EP | 2809090 A1 | 12/2014 |

OTHER PUBLICATIONS

International Search Report dated Oct. 20, 2017 for PCT/CN2017/094238 filed on Jul. 25, 2017, 8 pages including English translation.

* cited by examiner

POSITIONING APPARATUS, METHOD, MOBILE NODE AND WIRELESS COMMUNICATION APPARATUS

CROSS-REFERENCE TO RELATED APPLICATIONS

This application is a National Stage Application based on PCT/CN2017/094238, filed on 25 Jul. 2017, and claims priority to Chinese Patent Application No. 201610643379.7, filed on 8 Aug. 2016, the entire contents of which being incorporated herein by reference.

FIELD

The present disclosure relates to the technical field of wireless communications, and in particular to a positioning apparatus and a positioning method for positioning a mobile node, as well as a mobile node and a wireless communication device for a wireless communication system.

BACKGROUND

At present, the global navigation satellite system (GNSS) is one of the most common positioning models. However, in some specific scenarios such as an underground scenario and an indoor scenario, the global navigation satellite system cannot work effectively due to weak signals. Indoor positioning can solve the problem that the global navigation satellite system cannot work indoors. The indoor positioning method is usually realized via networks such as LTE (long term evolution), WLAN (wireless local area network), D2D (device to device), and V2X (vehicle to the outside). However, a mirror-image error often occurs during indoor positioning, which is usually much greater than a general positioning error. Immeasurable serious consequences may be brought to the safety of vehicles, pedestrians and related applications due to the mirror-image error.

In view of the above, a positioning apparatus and a positioning method for effectively eliminating a mirror-image error are provided according to the present disclosure.

SUMMARY

The present disclosure is briefly summarized hereinafter, so as to provide basic understanding of some aspects in relation to the present disclosure. It is understood that the summary is not an exhaustive overview of the present disclosure. It is neither intended to identify key or critical parts of the present disclosure, nor intended to delineate the scope of the present disclosure. The purpose is only to give some concepts in a simplified form, as a preface of the subsequent detailed descriptions.

In view of the above-described deficiencies in the conventional technology, a positioning apparatus and a positioning method for positioning a mobile node, as well as a mobile node and a wireless communication device for a wireless communication system are provided, to at least overcome the problems in the conventional technology.

A positioning apparatus for positioning a mobile node in a wireless communication system is provided according to an embodiment of the present disclosure. The positioning apparatus includes a processing circuitry. The processing circuitry is configured to determine location information of the mobile node based on distance measurement information determined by a neighbor node of the mobile node in response to distance measurement requests sent by the mobile node multiple times and location information of the neighbor node. The distance measurement information includes distance measurement results determined by the neighbor node for each of the distance measurement requests from the mobile node.

A mobile node for a wireless communication system is provided according to another embodiment of the present disclosure. The mobile node includes a communicating unit and a positioning unit. The communicating unit is configured to send distance measurement requests multiple times and receive distance measurement information fed back from a neighbor node of the mobile node in response to the distance measurement requests sent multiple times. The positioning unit is configured to determine location information of the mobile node based on the distance measurement information fed back from the neighbor node and location information of the neighbor node. The distance measurement information includes distance measurement results determined by the neighbor node for each of the distance measurement requests from the mobile node.

A wireless communication device for a wireless communication system is provided according to yet another embodiment of the present disclosure. The wireless communication device includes a communicating unit. The communicating unit is configured to receive distance measurement requests sent by a mobile node multiple times, and send distance measurement information determined in response to the distance measurement requests and location information of the wireless communication device to the mobile node, so that the mobile node determines location information of the mobile node based on the distance measurement information and the location information of the wireless communication dev ice. The distance measurement information includes distance measurement results determined by the wireless communication device for each of the distance measurement requests.

A positioning method for positioning a mobile node is provided according to another embodiment of the present disclosure. The positioning method includes: determining location information of the mobile node based on distance measurement information determined by a neighbor node of the mobile node in response to distance measurement requests sent by the mobile node multiple times and location information of the neighbor node. The distance measurement information includes distance measurement results determined by the neighbor node for each of the distance measurement requests from the mobile node.

In addition, a computer program for implementing the above positioning method is further provided according to an embodiment of the present disclosure.

In addition, a computer readable storage medium cm which computer program codes for implementing the above positioning method is further provided according to an embodiment of the present disclosure.

The above-described embodiments of the present disclosure can achieve at least the following advantages: a search area can be effectively reduced m the positioning process by sending the distance measurement requests multiple times, thereby eliminating the mirror-image error and significantly reducing the positioning error.

These and other advantages of the present disclosure will be clearer by describing the best embodiment of the present disclosure in conjunction with the drawings.

BRIEF DESCRIPTION OF THE DRAWINGS

The disclosure can be better understood with reference to the detailed description given below in conjunction with the accompanying drawings, throughout which identical or like reference signs in the drawings denote identical or like components. The drawings, together with the detailed description below, are incorporated in and form a part of the specification, for further illustrating preferred embodiments of the present disclosure with examples and explaining the principle and advantages of the present disclosure. In the drawings.

Figure 1:
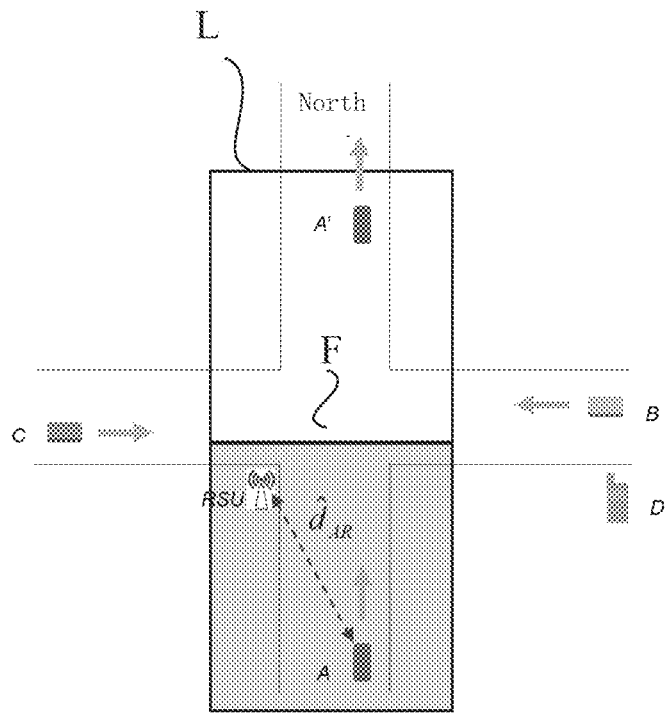
FIG. 1 is a schematic diagram illustrating a distribution of a mobile node and neighbor nodes in an underground garage scenario.

It should be understood by those skilled in the art that elements in the figures are shown merely for simplicity and clarity, but not necessarily drawn to scale. For example, the dimensions of some of the elements in the figures may be exaggerated relative to other elements to help to improve understanding of embodiments of the present disclosure.

DETAIL DESCRIPTION OF EMBODIMENTS

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such actual implementations so as to achieve the developers specific goals, for example, to comply with system- and business-related constraining conditions which will vary from one implementation to another. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only apparatus structures and/or processing steps closely related to the solution according to the present disclosure are illustrated in the drawings, and other details having little relationship to the present disclosure are omitted.

According to the conventional technology, in a case that an indoor positioning is performed through an existing mobile network (such as a communication network composed of WLAN and D2D users) indoor, when a node A with an unknown location communicates (for example, D2D or V2X communication) with a neighbor node, the mobile node A may estimate its own location coordinate $X_A$ using a least squares method. The estimating process is to find a point such that a sum of the square of a different between a distance from a coordinate of the point to each node M with a known location and a corresponding distance measurement result $\hat{d}_{AM}$ is the smallest, and the found point is an estimated coordinate of A. $\hat{d}_{AM}$ represents the distance measurement result between the nodes A and M. The node A with an unknown location may be a vehicle, a mobile station or the like, and the node M with a known location may be a vehicle, a mobile station, a road side unit (RSU), an eNB (LTE base station) or the like.

FIG. 1 is a schematic diagram illustrating a distribution of a mobile node and neighbor nodes in an underground garage scenario. As shown in FIG. 1, nodes B, C and D are mobile nodes with known positions (where the nodes B and C are vehicles with known positions, the node D is a mobile station with a known position). Node RSU is a road side unit with a known position, and node A is a vehicle with an unknown position. The nodes B, C, D and RSU can communicate with the node A and can perform the distance measurement function.

According to the conventional technology, in the indoor positioning process, a mirror-image error is a main reason for a positioning error. In FIG. 1, in a case that the mobile node A travels from south to north, $\hat{X}_A$ and $\hat{X}_{A'}$ are the coordinates of the location A and its mirror-image location A' respectively, and $\hat{X}_M$ is the positioning coordinate of a node M with a known location (for example, the nodes B, C, D), M is a neighbor node of A. Since an error usually occurs in a process of measuring $\hat{X}_M$ and $\hat{d}_{AM}$ (the distance measurement result of the node M with respect to the node A), a sum of the squares of the difference between, a distance of $\hat{X}_{A'}$ from each of M and a corresponding distance measurement result $\hat{d}_{AM}$ is less than or equal to a sum of the squares of a difference between a distance of $\hat{X}_A$ from each of M and a corresponding distance measurement result $\hat{d}_{AM}$. Therefore, $\hat{X}_{A'}$ may be determined as an estimated coordinate of A, rather than its actual location coordinate, thereby resulting in the mirror-image error.

In order to solve this technical problem, a positioning apparatus for positioning a mobile node in a wireless communication system based on multiple distance measurement results is provided according to the present disclosure.

Figure 2:
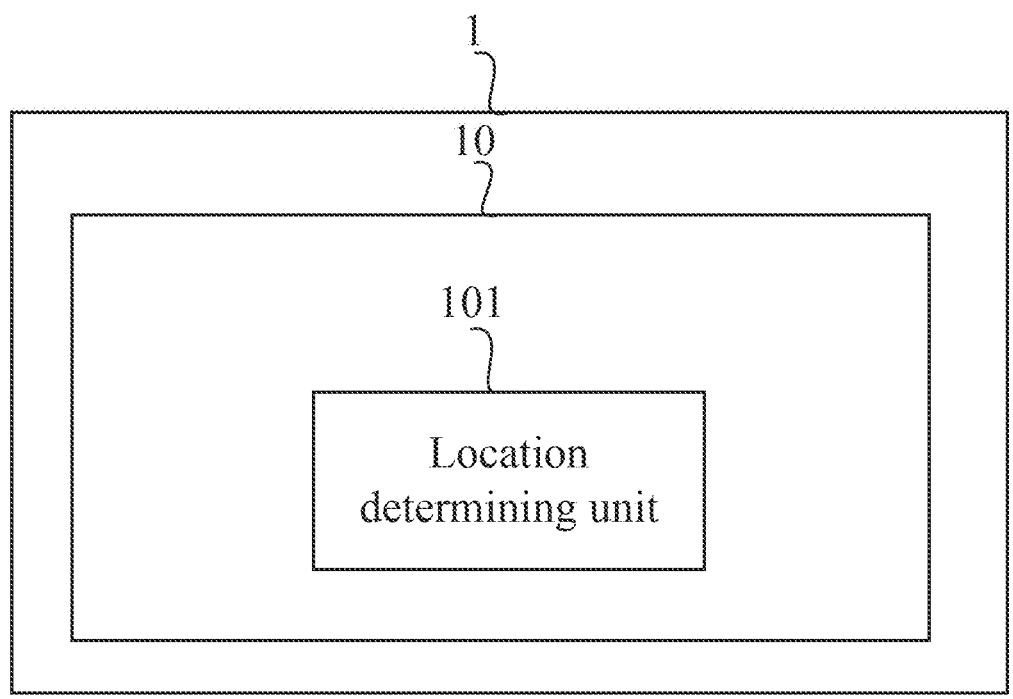
FIG. 2 is a block diagram illustrating a structure of a positioning apparatus for positioning a mobile node in a wireless communication system according to an embodiment of the present disclosure.

FIG. 2 is a schematic diagram illustrating a positioning apparatus for positioning a mobile node in a wireless communication system according to an embodiment of the present disclosure. As shown in FIG. 2, a positioning apparatus 1 includes a processing circuitry 10 configured to determine location information of the mobile node based on distance measurement information determined by a neighbor node of the mobile node in response to distance measurement requests sent by the mobile node multiple times and location information of the neighbor node. The distance measurement information includes distance measurement results determined by the neighbor node for each of the distance measurement requests from the mobile node.

Furthermore, an example of a functional module of the processing circuitry 10 is also shown in FIG. 2. As shown in FIG. 2, the processing circuitry 10 includes a location determining unit 101. It should be understood that the functional module may be implemented by a processing circuitry, or implemented by multiple pieces of processing circuitry together, or implemented as a pan of a processing circuitry; or, each functional module may be implemented by multiple pieces of processing circuitry. In other words, implementation of the functional module is not limitative. The processing circuitry 10 may be, for example, a central processing unit (CPU), a microprocessor, an integrated circuit module or the like which has data processing capability.

According to the present disclosure, the neighbor node is a static node or a mobile node the location of which may be determined by a process such as an indoor positioning process or the GNSS positioning process, and may communicate with a mobile node the location of which is to be determined. Also, according to the present disclosure, the neighbor node may measure a distance between the neighbor node and a mobile node using any distance measurement technique known in the art, to obtain the distance between the neighbor node and the mobile node, to determine the location of the mobile node. For example, the neighbor node may perform the distance measurement using a conventional distance measurement technique such as RSSI (received signal strength indication), TDOA (time difference of arrival), TOA (time of arrival), and AOA (angle of arrival), and the specific operations thereof are known in the field, which is not repeated here.

According to the present disclosure, the mobile node may send distance measurement requests to a neighbor node multiple times in a form of, for example, a broadcast, and the neighbor node may perform distance measurement in response to the distance measurement requests sent by the mobile node multiple times, that is, the neighbor node measures the distance between the neighbor node and tire mobile node sending the distance measurement request. According to the present disclosure, a sending interval at which the mobile node sends the two consecutive distance measurement requests may be the same or different.

Preferably, the mobile node may continuously send distance measurement requests to the neighbor node in the form of a broadcast, and the neighbor node may perform distance measurement in response to the distance measurement requests continuously sent by the mobile node, so that the positioning apparatus may position the mobile terminal based on multiple distance measurement results in response to distance measurement requests sent continuously.

According to the present disclosure, the neighbor node performs distance measurement in response to each of the multiple distance measurement requests sent by the mobile node multiple times. Specifically, the neighbor node performs one distance measurement every time a distance measurement request is received, thereby obtaining multiple distance measurement results tor multiple distance measurement requests.

According to an embodiment of the present disclosure, the neighbor node may send distance measurement information on tire distance measurement results for multiple distance measurement requests to the positioning apparatus 1 after receiving the last one of the distance measurement requests sent by the mobile node (for example, the last one of the distance measurement requests broadcast by the mobile node may include an end marker frame to determine that the distance measurement requests is the latest sent by the mobile node). According to the present disclosure, in order to prevent the occurrence of a signaling storm, for example, each neighbor node randomly waits for several time slots after receiving the end marker frame, and then feeds back the distance measurement result. The neighbor node feeds back all the distance measurement results of the measurements performed by mobile node to the positioning apparatus in response to the last one of distance measurement requests of the mobile node, thereby reducing unnecessary communication overhead.

According to an embodiment of the present disclosure, the distance measurement information fed back from the neighbor node may further include location information and electronic compass information of the neighbor node. That is, the neighbor node may fed back its location information and the electronic compass information together with the distance measurement result.

Moreover, according to an embodiment, of the present disclosure, in a case that the neighbor node senses that the mobile node is about to move out of a communication range of the neighbor node, even if the neighbor node has not received the last one of the distance measurement requests including the end marker frame from the mobile node, the neighbor node may fed back the distance measurement results of the distance measurements that are performed to the positioning apparatus 1, so that the positioning apparatus 1 collects more information for positioning the mobile node. The neighbor node may determine when the neighbor node is about to move out of the communication range of the mobile node based on, for example, the maximum communication radius of the mobile node obtained by the neighbor node and the moving direction and moving speed of the neighbor node. That is, the neighbor node determines when the distance measurement results of the distance measurements that have been performed are fed back to the positioning apparatus 1.

Although the case that all the distance measurement results of the measurements that are performed are fed back to the positioning apparatus 1 after the last one of the distance measurement requests is received is described above, the present disclosure is not limited thereto. For example, each neighbor node may fed back the distance measurement results to the positioning apparatus 1 at a predetermined time interval.

Generally, a greater sending interval with which the mobile node sends the distance measurement requests to the neighbor node multiple times may lead to a more accurately estimated search area (for example, the final search area described below) (i.e. the positioning result of the positioning apparatus for the mobile node is more accurate), which may results in a longer positioning delay. Therefore, according to the present disclosure, the positioning apparatus 1 may dynamically set a minimum sending interval with which the mobile node sends the distance measurement requests multiple times, so that the mobile node sends the distance measurement requests based on the minimum sending interval, thereby obtaining an accurate positioning result as quickly as possible.

Figure 3:
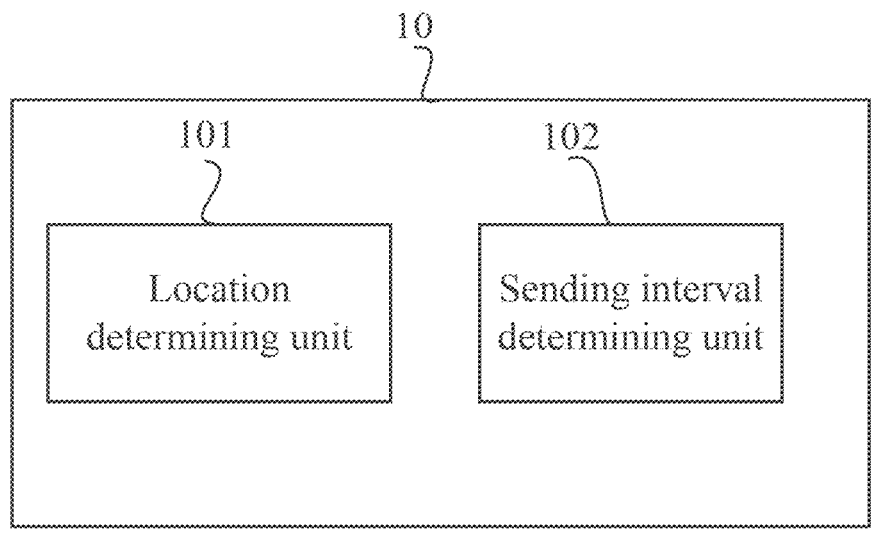
FIG. 3 is a block diagram illustrating another exemplary structure of a processing circuitry of a positioning apparatus according to an embodiment of the present disclosure.

FIG. 3 is a block diagram illustrating another exemplary structure of a processing circuitry of a positioning apparatus according to an embodiment of the present disclosure. As shown in FIG. 3, in addition to the location determining unit 101 similar to that in FIG. 2, the processing circuitry 10 further include a sending interval determining unit 102 for determining a minimum sending interval based on a preset minimum distinguishable distance (MDD) and a moving speed of the mobile node. The sending interval determining unit 102 may set a long sending interval in a case that the moving speed is low, and set a short sending interval win a case that the moving speed is high. For example, the sending interval determining unit 102 may determine the sending interval T(i) with which the mobile node sends the (i−1)-th and i-th broadcast requests based on the minimum distinguishable distance and the moving speed v(i−1) of the mobile node when broadcasting the (i−1)-th request, for example, by making T(i) proportional to MDD and inversely proportional to v(i−1). In a practical application, the mobile node uses the minimum sending interval determined by the sending interval determining unit 102 as a lower limit of the sending interval, and adjusts the sending interval with which the mobile node sends the distance measurement requests multiple times according to actual communication situations based on the minimum sending interval. For example, in the event of a congestion, the mobile node may send distance measurement requests at an increased sending interval to avoid aggravating the congestion.

It can be ensured that the broadcast request interval is calculated based on the moving speed and the preset minimum distinguishable distance, such that there is a significant difference among the relevant information obtained in response to the adjacent broadcast requests, thereby more effectively determining the location of the mobile node. In addition, the number of times of broadcast requests is suitably determined based on different application environments, thereby effectively reducing unnecessary broadcast requests, thus reducing communication overhead and reducing positioning delay.

According to the present disclosure, the sending interval determining unit 102 may preset the minimum distinguishable distance based on the density of neighbor nodes of the mobile node, the current communication environment and the like. For example, the sending interval determining unit 102 may set the minimum distinguishable distance to be small in a case that the density of the neighbor node is high, and may set the minimum distinguishable distance to be large when the density of the neighbor nodes is low. According to the present disclosure, the density of neighbor nodes may be determined, for example, by the neighbor node in response to node density request information sent by the mobile node.

Specifically, the mobile node may first send a broadcast request for requesting a node density before sending the distance measurement requests multiple times, and the neighbor node randomly waits for a certain time slot and then feed back the node density information to the mobile node, so that the sending interval determining unit 102 preset a minimum distinguishable distance based on the obtained neighbor node density information to determine the minimum sending interval. Alternatively, in a case that the neighbor node does not know the node density information, the sending interval determining unit 102 determines the node density information of the neighbor node of die mobile node based on the information fed back from the neighbor node in response to the node density request, thereby determining the minimum distinguishable distance and minimum sending interval based on the node density information. According to an embodiment of the present disclosure, in a case that the feedback regarding the node density information and other feedback information are still not received after waiting for a predetermined time interval and thus the node density information cannot be determined, the sending interval determining unit 102 may set the distinguishable distance to a default value, and determine the minimum sending interval based on this default value.

The sending interval determining unit 102 is configured to preset the minimum distinguishable distance based on the environmental noise and/or the fading of a communication environment in which the mobile node is located. The sending interval determining unit 102 may set a large minimum distinguishable distance in a case that the noise and/or fading is large, and set a small minimum distinguishable distance in a case that the noise and/or fading is small.

The sending interval determining unit 102 may dynamically determine the minimum sending interval between the two adjacent sending requests based on the moving speed and the minimum distinguishable distance of the mobile node, so that the sending intervals among adjacent distance measurement requests sent multiple times may be dynamically set to be the same or different.

According to the present disclosure, a different minimum distinguishable distance is used in a different communication environment, such that the frequency of sending distance measurement requests can be effectively controlled, thereby avoiding the occurrence of a signaling storm.

Figure 4:
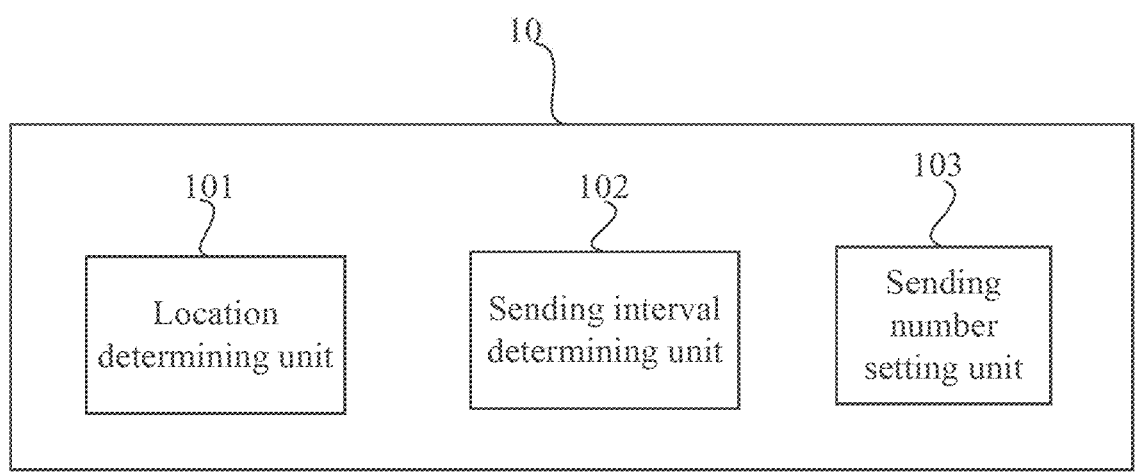
FIG. 4 is a block diagram illustrating yet another exemplary structure of a processing circuitry of a positioning apparatus according to an embodiment of the present disclosure.

FIG. 4 is a block diagram illustrating another exemplary structure of a processing circuitry of a positioning apparatus according to an embodiment of the present disclosure. As shown in FIG. 4, in addition to the location determining unit 101 and the sending interval determining unit 102 similar to those m FIG. 3, the processing circuitry 10 further include a sending number setting unit 103 for determining the number of times for which the mobile node sends the distance measurement requests based on at least one of the noise and/or lading of the communication environment in which the mobile node is located, the moving speed of the mobile node, and the minimum distinguishable distance set by the sending interval determining unit 102.

The sending number setting unit 103 may set a small number of times of requests, for example, in a case that the minimum distinguishable distance is large, the moving speed is high, or the noise and/or fading of the environment is small, and set a large number of times of distance measurement requests in a case that the minimum distinguishable distance is small, the moving speed is small, or the noise and/or fading is large.

According to the present disclosure, the number of times of broadcast distance requests is determined based on actual applications and device parameters, such that the positioning efficiency is improved in a case of accurately positing a mobile node.

Figure 5:
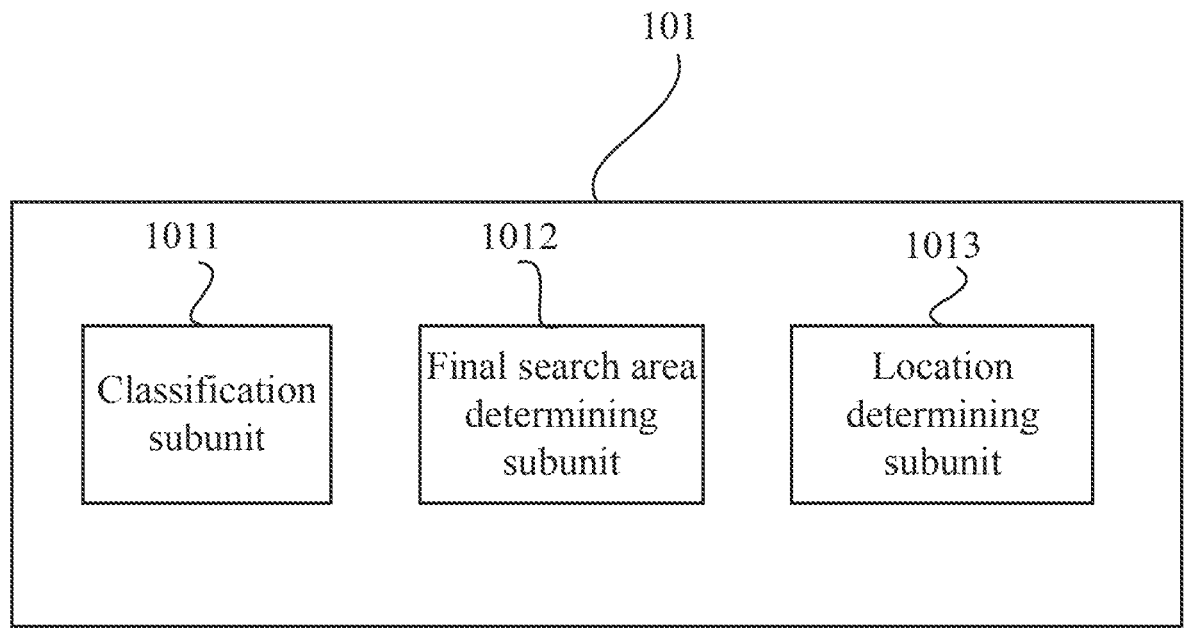
FIG. 5 is a block diagram illustrating an exemplary structure of a position determining unit according to the present disclosure.

FIG. 5 shows a block diagram of an exemplary structure of a location determining unit according to the present disclosure.

As shown in FIG. 5, the location determining unit 101 includes a classification subunit 1101, a final search area determining subunit 1012 and a location determining subunit 1013. The classification subunit 1011 is configured to classify the neighbor nodes. The final search area determining subunit 1012 is configured to determine a final search area of the mobile node based on the classification of the neighbor nodes and the distance measurement information fed back by the neighbor nodes. The location determining subunit 1013 is configured to determine location information of the mobile node based on the final search area and distance measurement information.

According to the present disclosure, the location determining unit 101 may determine the movement of the mobile node with respect to the reference point (i.e., whether the mobile node is moving towards the reference point or moving away from the reference point) based on the comparison of the multiple distance measurement results fed back from the neighbor node and the movement of the neighbor node with respect to the reference point, so as to exclude the area that does not conform with this movement (i.e., the area containing the mirror-image error) from the initial search area based on the movement of the mobile node with respect to the reference point.

According to an embodiment of the present disclosure, the classification subunit 1011 may classify the neighbor nodes based on the movement suites and directions of the neighbor nodes, so that the final search area may be determined more accurately for the mobile node, thereby accurately determining the location of the mobile node based on the final search area. Specifically, the classification subunit 1101 may be configured to first determine an initial search area, a reference line, and a reference point of the mobile node, and then classify the neighbor nodes based on the determined initial search area, the reference line, and the reference point.

According to the present disclosure, the classification subunit 1011 is configured to determine an initial search area based on the latest one of the distance measurement results in the distance measurement information determined by the neighbor node; determine a reference line based on a moving direction of the mobile node and a barycenter of the initial search area, and select a static neighbor node in the initial search area as a reference point; and classify the neighbor node based on movement of the neighbor node with respect to the reference point and the reference line.

According to an embodiment of the present disclosure, the classification subunit 1011 may determine the initial search area, for example, based on the distance measurement result of the last one of distance measurement fed back from the neighbor node, using a conventional frame determining method (for example, A. P. Peng. X. S. Guo, W. Cai et al. "A Distributed Localization Scheme for Wireless Sensor Networks Based on Bounding Box Algorithm [C], 9th International Conference on Electronic Measurement and Instruments (ICEMI 2009), Beijing, 2009: 2984-2988"). The method for determining the initial search area is the same as the method for determining the initial search area in which the location of the mobile node is determined based on a single distance measurement request of the mobile node in the conventional technology, and a detailed description thereof is omitted here for the sake of conciseness.

Then, the classification subunit 1011 determines the moving direction of the mobile node based on the obtained electronic compass information of the mobile node, and finds a moving route in the direction closest to the barycenter of the initial search area as a reference line. For example, in a case that the mobile node is located in a scenario including a road such as an underground garage, in a case that the mobile node is a mobile terminal mounted on the vehicle, the road on which the vehicle travels may be used as a reference line, and in a case that the mobile node is a mobile terminal held by a pedestrian, a road that a pedestrian may pass may be used as a reference line based on the moving direction of the mobile node. In a case that the mobile node is located in a large indoor square, the line passing through the barycenter of the initial search area in the moving direction may be used as a reference line.

The classification subunit 1011 may obtain a reference point based on the determined reference line. For example, in a case that the mobile node is located in an underground garage, a static node such as a road side unit RSU (including a road side unit, an ENB, an indoor base station, etc.) or an intersection closest to the barycenter of the initial search area on the reference line may be used as reference point.

Furthermore, in a case that the mobile node is located in an indoor square, the classification subunit 1011 may also use the barycenter of the initial search area as a reference point.

Although the case that the classification subunit 1011 first determines the reference line and then determines the reference point is described above, the present disclosure is not limited thereto. For example, a static node in the moving direction of the mobile node in the initial search area may be directly used as a reference point, and a line passing through the reference point in the moving direction is used as a reference line, thereby determining the reference point and the reference line.

Figure 6:
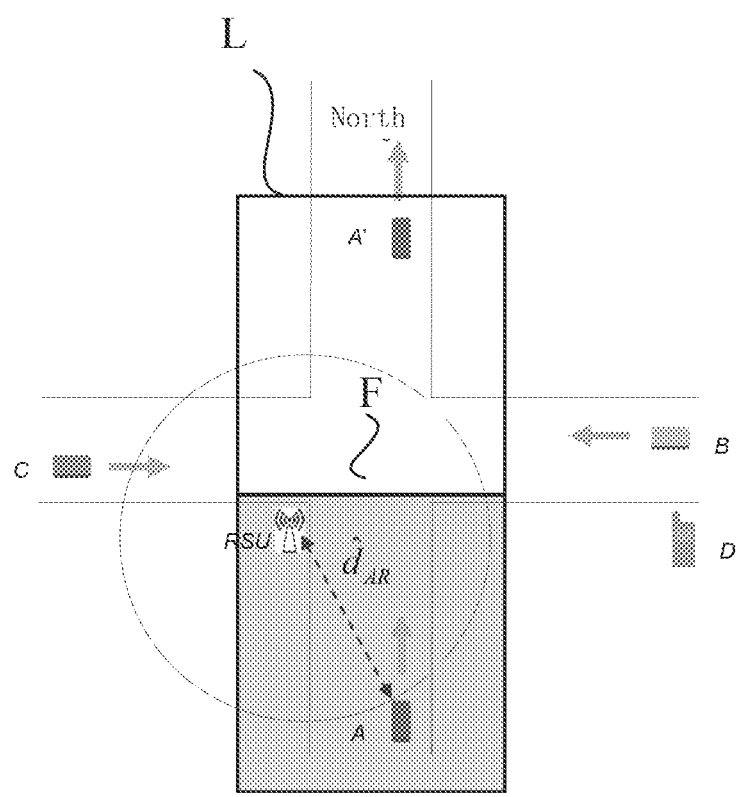
FIG. 6 illustrates an example of a method for determining a reference line m a vehicle scenario.

FIG. 6 is an example of a method for determining a reference line in a vehicle scenario. As shown in FIG. 6, the road side unit RSU is determined as a reference point by selecting a static neighbor node closest to the barycenter of the initial search area. After the mobile node A acquires the distance measurement result and the location information of the road side unit RSU from the road side unit RSU, a circle (the circle shown by the dotted line in the figure) is drawn centered on the location of the RSU with a radius of $\hat{d}_{AR}$ that is greater than the distance measurement value by the predetermined value (the predetermined value may be set based on a moving speed of the mobile node and a distance between the static node (in this example, i.e., the RSU) and the mobile node, for example, the predetermined value may be set to 0.1 times the distance measurement value). Since there is a high probability that A is within the circle, its reference line also pass through the inside of the circle. As shown in FIG. 6, it is apparent that only one road from the south to the north m the moving direction of the mobile node A passes through the inside of the circle, therefore, the classification subunit 1011 may use this road as a reference line.

After the reference point and the reference line are determined, the classification subunit 1011 may classify the neighbor nodes based on the case whether the neighbor node is moving away from the reference point or moving towards the reference point, so that the final search area subunit 1012 may remove the area containing the mirror-image position of the mobile node from the initial search area based on the classification of the neighbor nodes and the distance measurement results of the distance measurements performed by the neighbor node from the mobile node to form a final search area.

Specifically, the classification subunit 1011 may classify the neighbor nodes into the following three classifications based on the movements of the neighbor nodes with respect to the reference point and the reference line:

A first classification of neighbor node: a neighbor node which is moving towards the reference point and does not move in a direction of the reference line.

A second classification of neighbor node: a neighbor node which is moving away from the reference point and does not move in a direction of the reference line; and A third classification of neighbor node: a static neighbor node or a neighbor node which moves in a direction of the reference line.

According to the present disclosure, for example, the movement of the neighbor node with respect to the reference point and the reference line may be determined based on the location and the electronic compass information of the neighbor node.

Still taking FIG. 6 as an example, for the mobile node A, for example, an intersection close to the barycenter of the initial search area may be used as a reference point, and a road on which the mobile node A is located may be used as a reference line. Based on this, since the neighbor nodes B and C both move towards the reference point (i.e., the intersection) but do not move in the direction of the reference line, the neighbor nodes B and C may be classified into the first classification of neighbor nodes. It is assumed that the neighbor node D is moving away from the reference point and does not move in the direction of reference line, the neighbor node D may be classified into the second classification of neighbor node. Since the road side unit RSU is a static node, it may be classified into the third classification of neighbor node.

After the classification subunit 1011 classifies the neighbor nodes, the final search area determining subunit 1012 determines, based on the classification result of classification subunit 1011, the movement of the mobile mode with respect to the reference point according to movement of various neighbor nodes with respect to the reference point and the reference line and the distance measurement information determined by the neighbor modes, and determines the final search area based on movement of the mobile node with respect to the reference point.

According to an embodiment of the present disclosure, the final search area determining subunit 1012 compares, for each neighbor node, two adjacent distance measurement results in the distance measurement information determined by the neighbor node to determine the movement of the mobile node with respect to the reference point during a time period during the two adjacent distance measurement results based on the comparison result and the movement of the neighbor node with respect to the reference point, and performs statistics on determining results for all the neighbor nodes to determine whether the mobile node is moving towards the reference point or moving away from the reference point based on the statistics, thereby determining the final search area.

The final search area determining subunit 1012 may compare the two adjacent distance measurement results in the distance measurement results fed back from one neighbor node. It is assumed that the i-th and (i−1)-th distance measurement values between the mobile node A and the neighbor node M (for example, one of the neighbor nodes B, C, D. and RSU shown in FIG. 11 fed back from the neighbor node M are respectively represented as $\hat{d}_{AM}(i)$ and $\hat{d}_{AM}(i-1)$ (where i is an integer greater than or equal to 2), the following determination may be made.

(1) If the neighbor node M is a second classification of neighbor node or a third classification of neighbor node, in a case that the i-th distance measurement value $\hat{d}_{AM}(i)$ is less than the (i−1)-th distance measurement value $\hat{d}_{AM}(i)$, it is considered that the present comparison result indicates that the mobile node A is moving towards the neighbor node M, thereby moving towards the reference point; and in a case that the i-th distance measurement value $\hat{d}_{AM}(i)$ is greater than the (i−1)-th distance measurement value $\hat{d}_{AM}(i)$, it is impossible to determine whether the mobile node is moving towards the reference point, so the present comparison result may be discarded.

(2) If the neighbor node M is a second classification of neighbor node or a third classification of neighbor node, in a case that the i-th distance measurement value $\hat{d}_{AM}(i)$ is greater than the (i−1)-th distance measurement value it is considered that the present comparison result indicates that the mobile node A is moving away from the neighbor node M to move away from the reference point, and in a case that the i-th distance measurement value $\hat{d}_{AM}(i)$ is less than the (i−1)-th distance measurement value $\hat{d}_{AM}(i)$, it is impossible to determine whether the mobile node is moving away from the reference point, so the present comparison result may be discarded.

As described above, it is determined whether the mobile node is moving towards the reference point or moving away from the reference point by comparing the distance measurement value of each neighbor node with respect to the mobile node, but the present disclosure is not limited thereto. For example, it may also be determined whether the mobile node is moving away from the reference point or moving towards the reference point by comparing the change of the angle of arrival during the neighbor node performs the two adjacent distance measurements. A person skilled in the art may determine the movement of the mobile node with respect to the reference point based on the change of the angle of arrival be referring to the operation that the movement of the mobile node with respect to the reference point is determined based on the change of the distance measurement value, and a detailed description thereof is omitted here.

The final search area determining subunit 1012 may compare two adjacent distance measurement results in the distance measurement results fed back from each neighbor node. For example, for a neighbor node, in a case that the distance measurement information fed back includes n distance measurement results, the final search area determining subunit 1012 may perform n−1 times of comparisons to obtain n−1 comparison results. Then, for each neighbor node, the final search area determining subunit 1012 performs statistics on the number of times for which the mobile node is determined to move away from the reference point and the number of times for which the mobile node is determined to move towards the reference point, and accumulates the comparison results tor all the neighbor nodes, thereby obtaining the statistic number of times for which the mobile node is determined to move away from the reference point and the statistic number of times for which the mobile node is determined to move towards the reference point for all neighbor nodes, which are represented by $U_A$ and $U'_A$ respectively.

Although the case that the statistics is first performed on the comparison result of each neighbor node and the comparison results of all neighbor nodes are accumulated is described above, the present disclosure is not limited thereto. For example, statistics may be first performed on comparison results of i-th and (i−1)-th distance measurements for all neighbor nodes, and then each of the comparison results in (n−1)-th comparison results is accumulated in a case that the distance measurement is performed at n times.

Based on the statistics of the comparison results obtained after comparing the two adjacent distance measurement results for all neighbor nodes, the number of times for which the mobile node is determined to move towards the reference point and the number of times for which the mobile node is determined to move away from the reference point may be obtained. If it is determined that the number of times $U_A$ for which the neighbor node is moving towards the reference point is greater than the number of times $U'_A$ for which the neighbor node is moving away from the reference point, it may be determined that the mobile node A is moving towards the reference point, so that the final search area determining subunit 1012 may determine the area where mobile node moves closer to the reference point as the final search area. If it is determined that the number of times $U_A$ for which the neighbor node is moving towards the reference point is greater than the number of times $U'_A$ for which the neighbor node is moving away from the reference point, it may be determined that the mobile node A is moving towards the reference point, so that the final search area determining subunit 1012 may determine the area where the mobile node moves further away from the reference point as the final search area.

According to a preferred embodiment of the present disclosure, the sending interval determining unit 102 may set the distance measurement interval at which the mobile node sends the distance measurement requests multiple times to be greater than the determined minimum sending interval, so that the final search area determining subunit 1012 determines the final search area more accurately.

According to the present disclosure, by classifying neighbor nodes, the movement of the mobile node with respect to the reference point is determined more effectively, thereby accurately determining the final search area for positioning the mobile node.

According to the present disclosure, the final search area determining subunit 1012 is further configured to: divide the initial search area into multiple initial search sub-areas with a dividing line; and determine the initial search sub-area conforming with the movement of the mobile node with respect to the reference point as the final search area based on a determining result about whether the mobile node is moving towards the reference point or moving away from the reference point. The dividing line may be a straight line passing through the reference point and perpendicular to the reference line. For example, the final search area determining subunit 1012 determines a dividing line based on the reference point and the reference line to divide the search area into two areas (that is, an area including the mirror-image error of the mobile node and an area including the actual location of the mobile node), for example, a straight line passing through the reference point and perpendicular to the reference line may be used as a dividing line.

The dividing line is determined not limited to in the above manner. For example, a line passing through the reference point and perpendicular to the moving direction of the moving node may be used as a dividing line.

For example, taking FIG. 1 as an example, the initial search area is represented by a block L in FIG. 1, and the final area determining subunit performs statistics on the number of times $U_A$ for which the mobile node A is determined to move towards the reference point is 3, and the number of times $U'_A$ for which the mobile node A is determined to move away from the reference point is 0. In this case, first, a straight line passing through the reference point (i.e., the intersection in FIG. 1) and perpendicular to the reference line (i.e., the longitudinal road in FIG. 1) is made. Obviously, this straight line is parallel to the lateral road in FIG. 2 and is located at the center of the lateral road. Since $U_A > U'_A$, it is determined that the mobile node A is moving towards the reference point. In addition, the compass information of the mobile node A indicates that it is moving northward, since A knows that it is moving on the longitudinal road in FIG. 1 through the initial search area, it takes the lower part of the block L in FIG. 1 (i.e., the shaded area in FIG. 1, the area F) as the final search area. In this case, since the final search area thus determined does not include the location of the mirror-image error of the mobile node, it is avoided to position the mobile node to the location where the mirror-image error is located when the location of the mobile node is finally positioned.

After determining the final search area, the location determining subunit 1013 may determine location information of the mobile node based on the final search area and the distance measurement information. According to the present disclosure, the location determining subunit 1013 may determine the location information of the mobile node based on the final search area and the distance measurement information fed back from the mobile node and the location of the neighbor node using algorithms well known in the art, such as the ant colony algorithm and the two-dimensional logarithmic search algorithm. Since the final search area determining unit 1012 excludes the area including the mirror-image error of the mobile node in determining the final search area, the location determining subunit 1013 may determine the location of the mobile node more accurately.

The positioning apparatus 1 according to the present disclosure may be an independent positioning apparatus or may be located within the mobile node.

Figure 7:
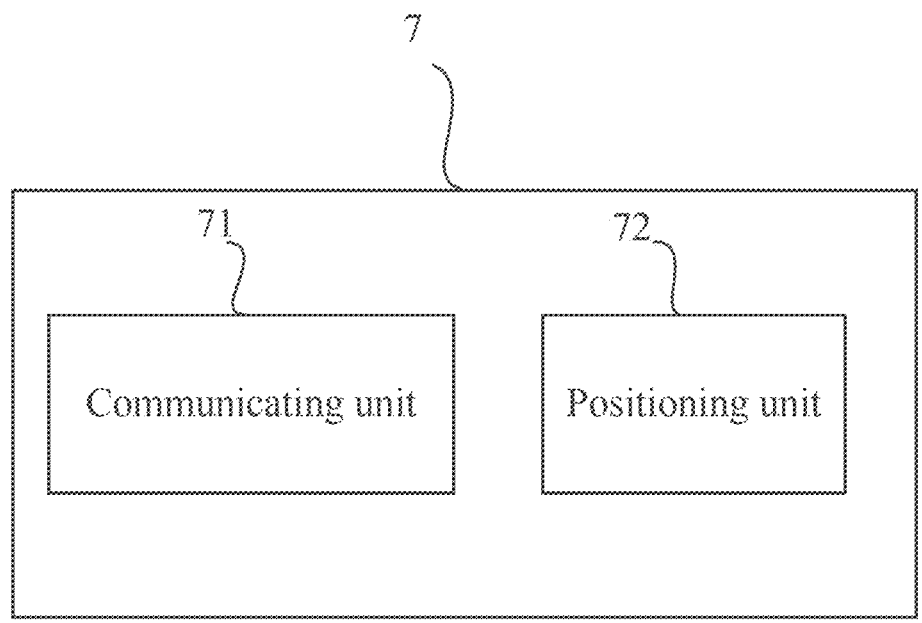
FIG. 7 is a block diagram illustrating a structure of a mobile node for a wireless communication system according to the present disclosure.

FIG. 7 is a block diagram illustrating a structure of a mobile node for a wireless communication system according to the present disclosure. As shown in FIG. 7, the mobile node 7 includes a communicating unit 71 and a positioning unit 72. The communicating unit 71 is configured to send distance measurement requests multiple times and receive distance measurement information fed back from a neighbor node of the mobile node in response to the distance measurement requests sent multiple times. The positioning unit 72 is configured to determine location information of the mobile node based on the distance measurement information fed back from the neighbor node and location information of the neighbor node. The distance measurement information includes distance measurement results determined by the neighbor node for each of the distance measurement requests from the mobile node.

According to a preferred embodiment of the present disclosure, the communicating unit 71 is configured to continuously send distance measurement requests and receive distance measurement information fed back from a neighbor node of the mobile node in response to the continuously sent distance measurement requests.

The positioning process performed by the positioning unit 72 of the mobile node 7 may be the same as or similar to the positioning process of the positioning apparatus described above with reference to FIGS. 1 to 6, and a description thereof is omitted here.

The communicating unit 71 may determine minimum sending interval at which the mobile node sends the distance measurement requests multiple times, based on, for example, a minimum distinguishable distance preset by the positioning unit 72 and a moving speed of the mobile node, and send distance measurement requests (for example, in the form of a broadcast) to the neighbor node multiple times. The minimum distinguishable distance may also be preset, for example, by the positioning unit 72 based on at least one of the node density of the neighbor node of the mobile node, the noise and/or fading of the communication environment in which the mobile node is located.

According to an embodiment of the present disclosure, the communicating unit 71 is further configured to: send a node density request for requesting node density information of the neighbor node of the mobile node before sending the distance measurement requests; and receive the node density information fed back from the neighbor node in response to die node density request, such that the positioning unit presets a minimum distinguishable distance based on the node density information and determines, based on the minimum distinguishable distance, a minimum sending interval with which the mobile node sends the distance measurement requests multiple times. If the communicating unit 71 still receives no feedback regarding the node density information and other feedback information after waiting for a predetermined time interval, the positioning unit 72 may set the minimum distinguishable distance as a default value, so that the communicating unit 71 may determine the minimum sending interval based on the default value.

According to an embodiment of the present disclosure, the communicating unit 71 is further configured to: receive the distance measurement information fed back from the neighbor node after the neighbor node receives the last one of the distance measurement requests sent by the communicating unit or when it is determined that the mobile node is about to move out of a communication range of the neighbor node. The distance measurement information includes the distance measurement results determined by the neighbor node through executing each of the distance measurement requests. According to the present disclosure, the communicating unit 71 is further configured to receive the location information and the compass information of the mobile node while receiving the distance measurement information to determine the moving direction of the mobile node by the compass information.

The communicating unit is further configured to send a node density request for requesting node density information before the distance measurement requests are sent, and receive the node density information fed back from the neighbor node in response to the node density request.

The positioning process, the process for determining the minimum sending interval, and the process for setting the number of times of sending performed by the positioning unit 72 of the mobile node 7 may be, for example, the same or similar to the positioning process, the process for determining the minimum sending interval, and the process for setting the number of times of sending performed by the positioning apparatus as described above with reference to FIGS. 1 to 6, and a detailed description thereof is omitted here.

Figure 8:
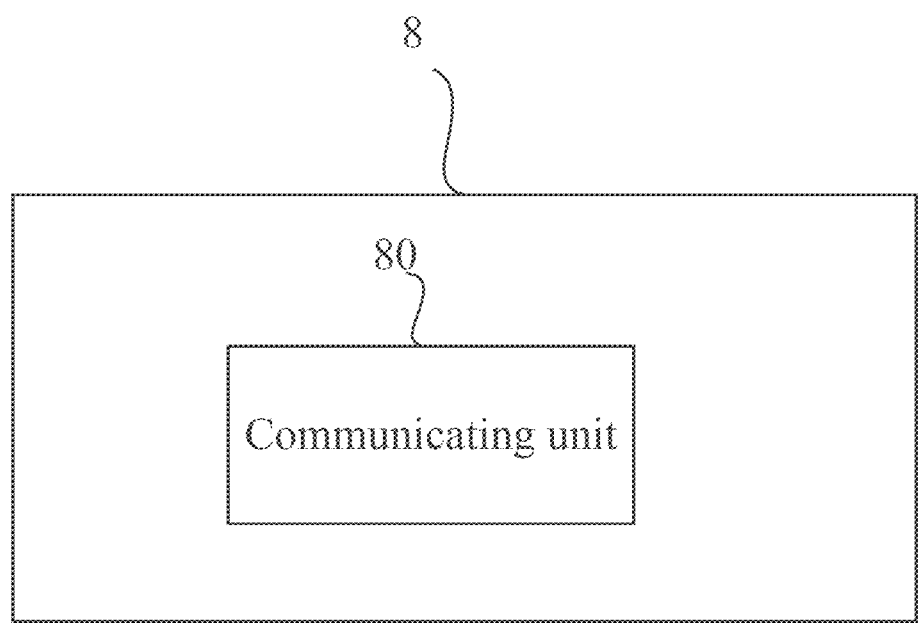
FIG. 8 is a block diagram illustrating a structure of a wireless communication device according to the present disclosure.

According to the present disclosure, a wireless communication device in a wireless communication system is further provided. FIG. 8 is a block diagram illustrating a structure of the wireless communication device according to the present disclosure.

As shown in FIG. 8, the wireless communication device 8 includes a communicating unit 80. The communicating unit 80 is configured to receive distance measurement requests sent by a mobile node multiple limes and send distance measurement information determined in response to the distance measurement requests and location information of the wireless communication device to the mobile node, such that the mobile node determines location information of the mobile node based on the distance measurement information and the location information of the wireless communication device. The distance measurement information includes distance measurement results determined by die wireless communication device for each of the distance measurement requests.

According to a preferred embodiment of the present disclosure, the communicating unit 80 is configured to receive distance measurement requests continuously sent by the mobile node, and send distance measurement information determined in response to the distance measurement requests and location information of the wireless communication device to the mobile node.

According to the present disclosure, the communicating unit 80 is further configured to send the distance measurement information after the wireless communication device receives the last one of the distance measurement requests sent by the mobile node or in a case that it is determined that the mobile node is about to move out of a communication range of the wireless communication device, thereby reducing communication overhead.

The communicating unit is further configured to receive a node density request for requesting node density information sent by the mobile node and send the node density information to the mobile node in response to the node density request, such that the mobile node presets a minimum distinguishable distance based on the node density information from the wireless communication device and determines a minimum sending interval with which the mobile node sends the distance measurement requests multiple times based on the minimum distinguishable distance.

The wireless communication device 8 according to an embodiment of the present disclosure may be a neighbor node capable of communicating with a mobile node as described with reference to FIGS. 1 to 6, such as a base station serving a mobile node, a mobile terminal other than the mobile terminal used as the mobile node, or a road side unit RSU, and the mobile node according to art embodiment of the present disclosure may be a mobile terminal of which the location is unknown, such as the mobile node described with reference to FIG. 7.

A positioning method corresponding to the positioning apparatus according to the present disclosure for positioning a mobile node is further provided according to the present disclosure. Hereinafter, an overview of the methods is given without repeating some details disclosed above. However, it should be noted that, although the method are disclosed in a process of describing the positioning apparatus for positioning the mobile node, the methods do not necessarily employ or are not certainly performed by the aforementioned components. For example, the embodiments of the positioning apparatus for positioning the mobile node may be partially or completely implemented with hardware and/or firmware, the method described below may be performed by a computer-executable program completely, although the hardware and/or firmware of the positioning apparatus for positioning the mobile node can also be used in the methods.

Figure 9:
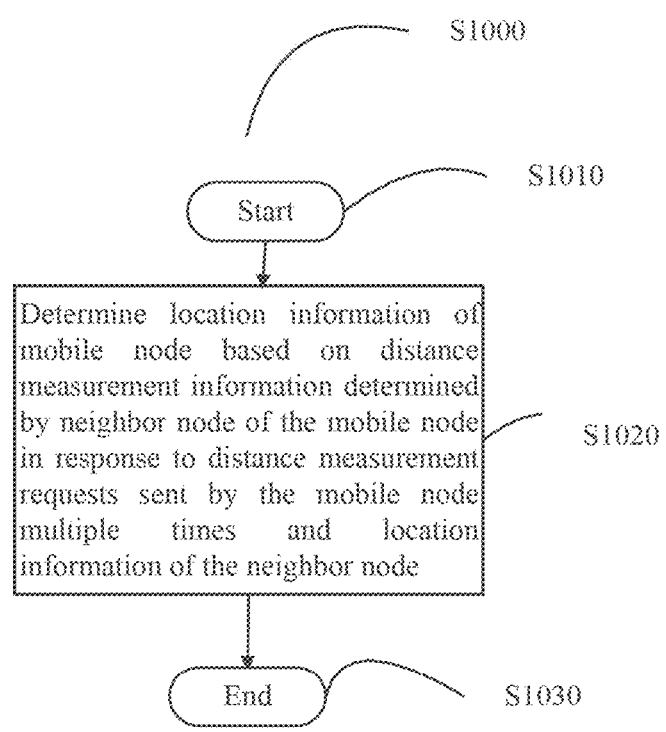
FIG. 9 is a flowchart illustrating a positioning method for positioning a mobile node according to an embodiment of the present disclosure.

FIG. 9 is a flowchart illustrating a method for a positioning a mobile node according to an embodiment of the present disclosure.

As shown in FIG. 9, the processing flow S1000 of the positioning apparatus according to an embodiment of the present disclosure is started with step S1010, and the processing at step S1020 is then performed.

At step S1020, location information of the mobile node is determined based on distance measurement information determined by a neighbor node of the mobile node in response to distance measurement requests sent by the mobile node multiple times and location information of the neighbor node. The distance measurement information includes the distance measurement result determined by the neighbor node for each of the distance measurement requests from the mobile node. For example, step S1020 may be implemented by performing, for example the processing performed by the classification unit 101 as described in FIG. 2, and the description thereof is omitted here. Then, step S1030 is performed.

The processing flow S1000 is ended with step S1030.

In the positioning method according to the present disclosure, the mobile node may be a mobile terminal, and the neighbor node may be at least one of a base station serving the mobile node, a mobile terminal, and a road side unit RSU.

In the positioning method according to the present disclosure, at step S1020, location information of the mobile node may be determined based on distance measurement information determined by a neighbor node of the mobile node in response to distance measurement requests continuously sent by the mobile node respectively and location information of the neighbor node.

According to the positioning method of the present disclosure, at step S1020, the location information of the mobile node may be determined based cm the distance measurement information fed back from the neighbor node after receiving the last one of the distance measurement requests sent by die neighbor node or m a case that it is determined that the mobile node is about to move out of a communication range of the neighbor node.

According to the positioning method of the present disclosure, before step S1020, a minimum sending interval with which the mobile node sends the distance measurement requests multiple times may be determined based on a preset minimum distinguishable distance and a moving speed of the mobile node, such that the mobile node sends the distance measurement requests to the neighbor node with the minimum sending interval multiple times. The minimum distinguishable distance is preset based on a node density of the neighbor nodes of the mobile node. According to the positioning method of the present disclosure, before step S1020, the minimum distinguishable distance may be preset based on the noise and/or fading of a communication environment in which the mobile node is located, and the number of times for which the mobile node sends the distance measurement requests multiple times is determined based on at least one of the noise and/or fading of the communication environment in which the mobile node is located, the moving speed of the mobile node and the minimum distinguishable distance. For example, the above-described processing may be implemented by performing the processing of the sending interval determining unit 102 described with reference to FIG. 3 and the sending number setting unit 103 described with reference to FIG. 4, and a description thereof is omitted here.

According to an embodiment of the present disclosure, the positioning process of step S1020 includes: classifying the neighbor node; determining a final search area for the mobile node based on classification of the neighbor node and the distance measurement information determined by the neighbor node; and determining the location information of the mobile node based on the final search area and the distance measurement information.

Specifically, the positioning process performed at stem S1020 may include: determining an initial search area based on the latest one of the distance measurement results in the distance measurement information determined by the neighbor node; determining a reference line based on a moving direction of the mobile node and a barycenter of the initial search area, and selecting a static neighbor node in the initial search area as a reference point; and classifying the neighbor node based on movement of the neighbor node with respect to the reference point and the reference line. According to the present disclosure, the classifying the neighbor nodes may include: classifying the neighbor nodes into the following three classifications based on the movement of the neighbor node with respect to the reference point and the reference line:

A first classification of neighbor node: a neighbor node which is moving towards the reference point and does not move in a direction of the reference line;

A second classification of neighbor node: a neighbor node which is moving away from the reference point and does not move in a direction of the reference line; and A third classification of neighbor node: a static neighbor node or a neighbor node which moves in a direction of the reference line.

According to the present disclosure, the process of determining the final search area may include: determining the movement of the mobile node with respect to the reference point based on movements of various neighbor nodes with respect to the reference point and reference line and the distance measurement information determined by the neighbor node; and determine the final search area based on the movement of the mobile node with respect to the reference point. Specifically, according to an embodiment of the present disclosure, the process of determining the final search area may include, for each of the neighbor nodes, comparing two adjacent distance measurement results in the distance measurement information determined by the neighbor node, to determine the movement of the mobile node with respect to the reference point during a time period corresponding to the two adjacent distance measurement results based on the comparison result and the classification of the neighbor node; and performing statistics on determining results corresponding to all of the neighbor nodes, to determine whether the mobile node is moving towards the reference point or moving away from the reference point based on the statistics, to determine the final search area. More specifically, for the first classification of neighbor nodes and the third classification of neighbor nodes, in a case that the i-th distance measurement result is less than the (i−1)-th distance measurement result determined by the neighbor node, it is determined that the mobile node is moving towards the reference point. For the second classification of neighbor node and the third classification of neighbor node, in a case that the i-th distance measurement result is greater than the (i−1)-th distance measurement result determined by the neighbor node, it is determined that the mobile node is moving away from the reference point, where i is an integer greater than or equal to 2.

According to the present disclosure, the process of determining the final search area may include: dividing the initial search area into multiple initial search sub-areas with a dividing line; and determining the initial search sub-area conforming with the movement of the mobile node with respect to the reference point as the final search area based on a determining result about whether the mobile node is moving towards the reference point or moving away from the reference point. The dividing line is a straight line passing through the reference point and perpendicular to the reference line.

For example, the above-described processing of classifying the neighbor nodes and processing of determining the final search area may be realized by performing processing such as the classification subunit 1011 and the final search area determining subunit 1012 described with reference to FIG. 5, and a description thereof is omitted here.

Figure 10:
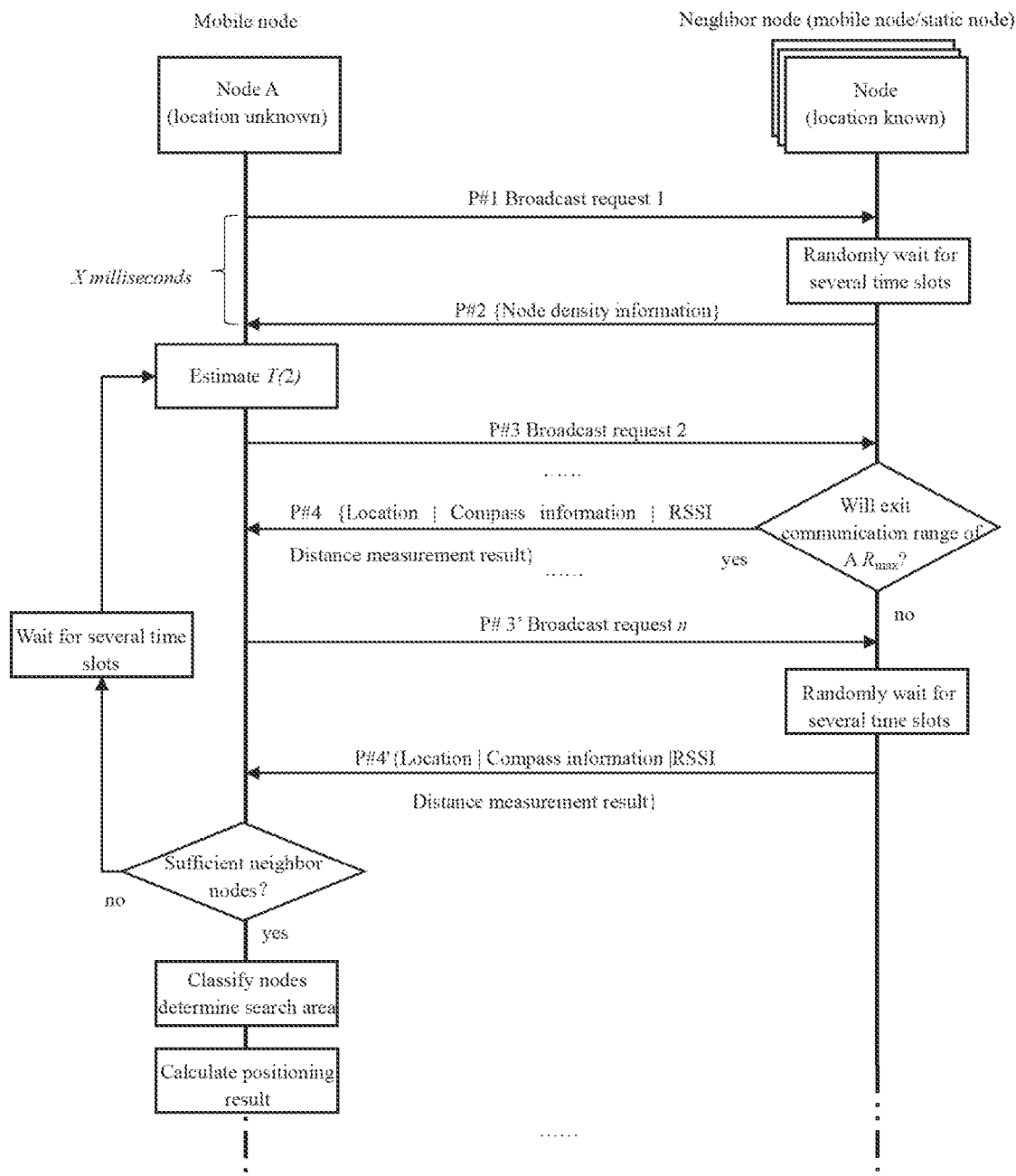
FIG. 10 is a signaling interaction diagram of an example of a positioning method for positioning a mobile node according to an embodiment of the present disclosure.

FIG. 10 is a signaling interaction diagram illustrating an example of a positioning method for positioning a mobile node according to an embodiment of the present disclosure. Herein, the mobile node in FIG. 10 is a mobile node including a positioning unit.

As shown in FIG. 10, at P #1, a mobile node with an unknown location broadcasts a node density request for requesting node density information. At P #2, the neighbor node with a know n location which is capable of communicating with the mobile node feeds hack the node density information after randomly waiting for several time slots, or sends response information in a case that the node density information is unknown. Then the mobile node determines the minimum sending interval with which the mobile node sends the distance measurement requests multiple times (which is shown as estimate T2 in the figure). At P #3, the mobile node broadcasts the distance measurement requests multiple times based on the determined minimum sending interval. Then, m a case that the neighbor node determines that it is about to move out of the communication range of the mobile node, the neighbor node feeds back, at P #4, the distance measurement results (as shown in the figure, in a case that the neighbor node performs RSSI distance measurement, the RSSI distance measurement results is fed back) including the distance measurement results that has been performed by the neighbor node, and the location information and the electronic compass information of the neighbor node to the mobile node together; or feeds back, at P #4', the distance measurement results performed for all the distance measurements and the location information and the electronic compass information of the mobile node to the mobile node together after waiting for the predetermined time slots after receiving the last one of the distance measurement requests (the broadcast request n in the figure) from the mobile node. After acquiring the distance measurement information including the distance measurement results and the location information and the electronic compass information of the mobile node fed back by the neighbor node, the mobile node performs the processes of classifying the neighbor nodes, determining the final search area and determining the location of the mobile node. As shown in FIG. 10, before performing the above location information determining process, the mobile node may also determines whether the distance measurement information received from the neighbor nodes is sufficient, that is, whether the distance measurement information fed back by the neighbor node is sufficient. If the distance measurement information fed back by the neighbor node is sufficient, the above location information determining process is performed; if the distance measurement information fed back by the neighbor node is not sufficient, the distance measurement requests are broadcasted again to the neighbor nodes multiple times after waiting for a certain time period, until the sufficient distance measurement information fed back by the neighbor nodes is obtained.

Figure 11:
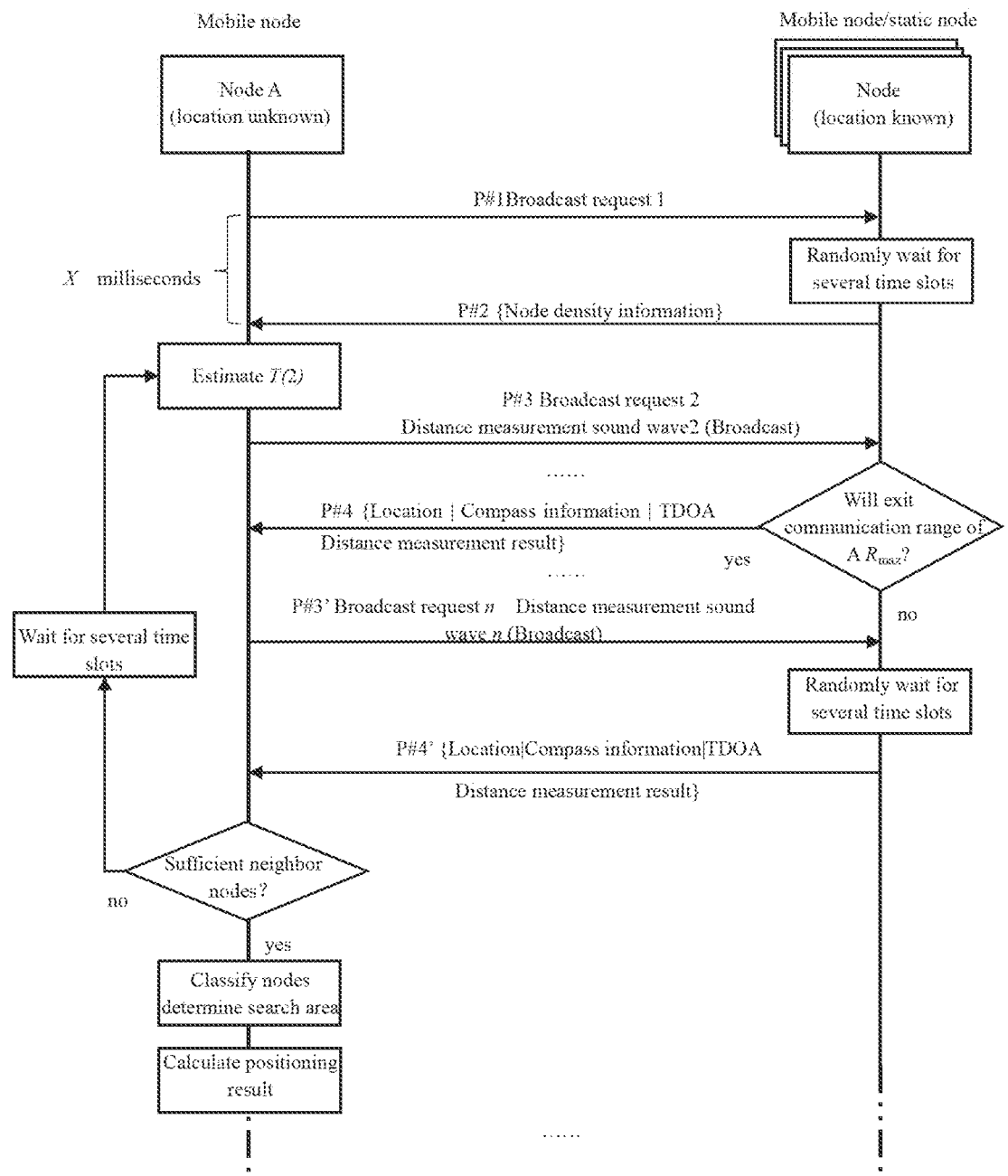
FIG. 11 is a signaling interaction diagram of another example of a positioning method for positioning a mobile node according to an embodiment of the disclosure.

FIG. 11 is a signaling interaction diagram illustrating another example of a positioning method for positioning a mobile node according to an embodiment of the disclosure. In the example of FIG. 11, the neighbor node performs TDOA distance measurement.

The signaling interaction diagram shown in FIG. 11 is similar to that in FIG. 10 except that the neighbor node performs TDOA distance measurement and the mobile node broadcasts the distance measurement requests multiple times based on the determined minimum sending interval while sending the distance measurement sound wave in the form of the broadcast at P #3. The process of sending distance measurement sound waves using TDOA is similar to that of the conventional technology, and the description thereof is not described in detail here.

Figure 12:
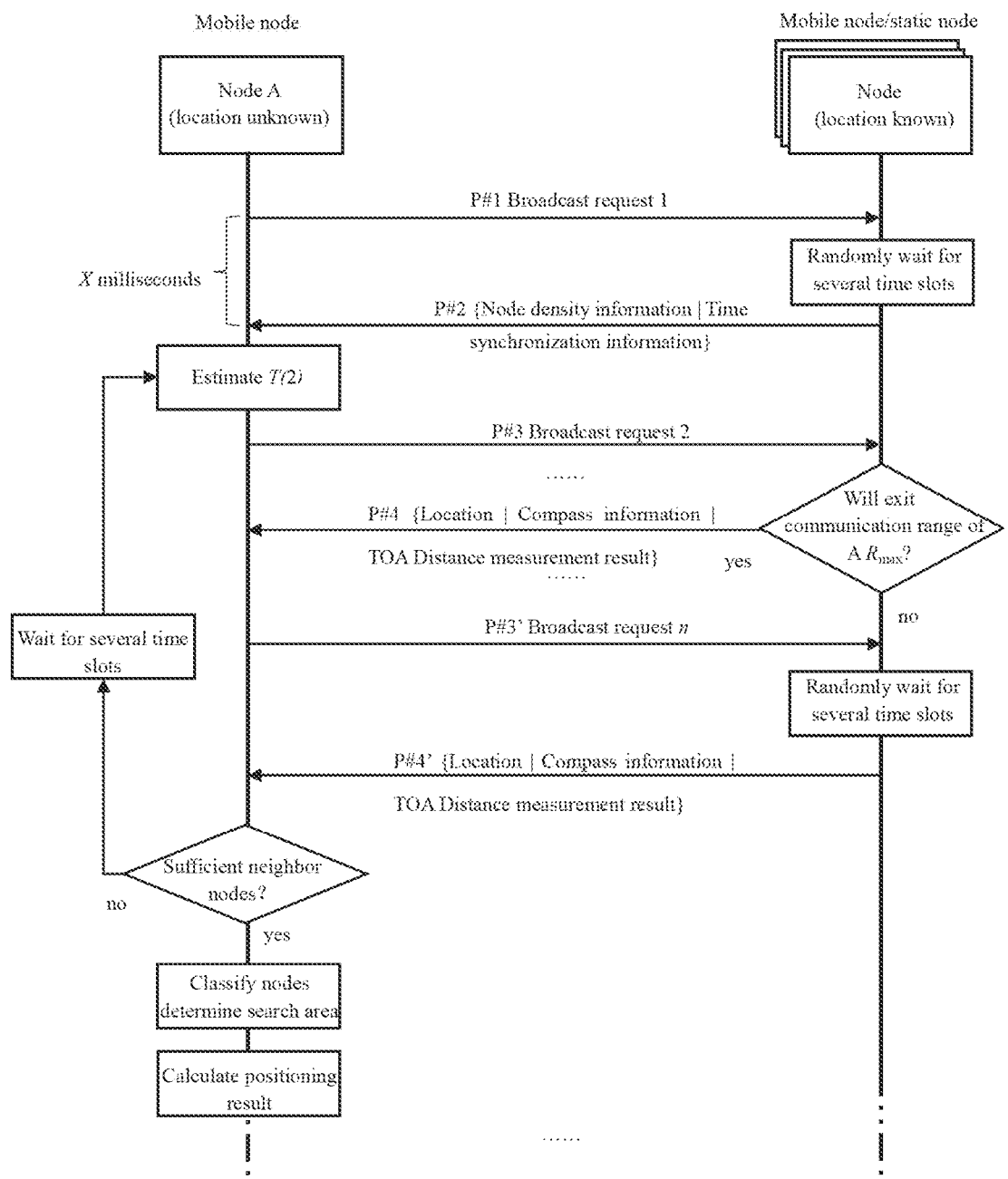
FIG. 12 is a signaling interaction diagram of yet another example of a positioning method for positioning a mobile node according to an embodiment of the present disclosure.

FIG. 12 is a signaling interaction diagram illustrating an example of a positioning method for positioning a mobile node according to another embodiment of the present disclosure. In the example of FIG. 12, the neighbor node performs TOA distance measurement.

Signaling interaction diagram shown in FIG. 12 is similar to that m FIG. 10, except that the neighbor node performs TOA distance measurement, the mobile node broadcasts a time synchronization request while broadcasting the node density request at P #1, the neighbor node feeds back the time synchronization information while feeding back the node density information at P #2, and the processed as P #3, P #4, and P #3', P #4' are performed only after the time synchronization information is successfully fed back.

A simulation experiment is performed on the method for estimating a search area for a mobile node provided in the present disclosure by changing the parameters such as node density, environmental noise and hiding, and the results is compared with that of a conventional solution m which broadcast requests are not sent multiple times.

Figure 13:
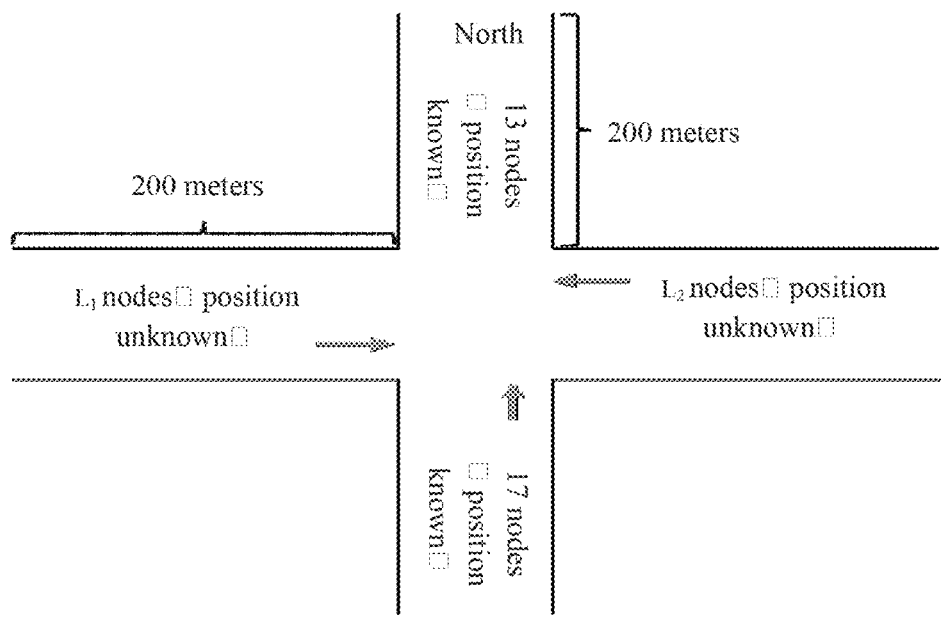
FIG. 13 illustrates an experimental scenario in which a simulation experiment is performed using a positioning apparatus according to an embodiment of the present disclosure.

FIG. 13 shows a scenario of the simulation experiment. As shown in FIG. 13, the positions of all mobile nodes on the longitudinal road are known, 17 nodes move from south to north, and 13 nodes move from north to south. The positions of nodes on the horizontal road are unknown. L1 nodes move from west to east, and L2 nodes move from east to west. The length of both roads is 400 meters (each segment of each road is 200 meters).

Figure 14:
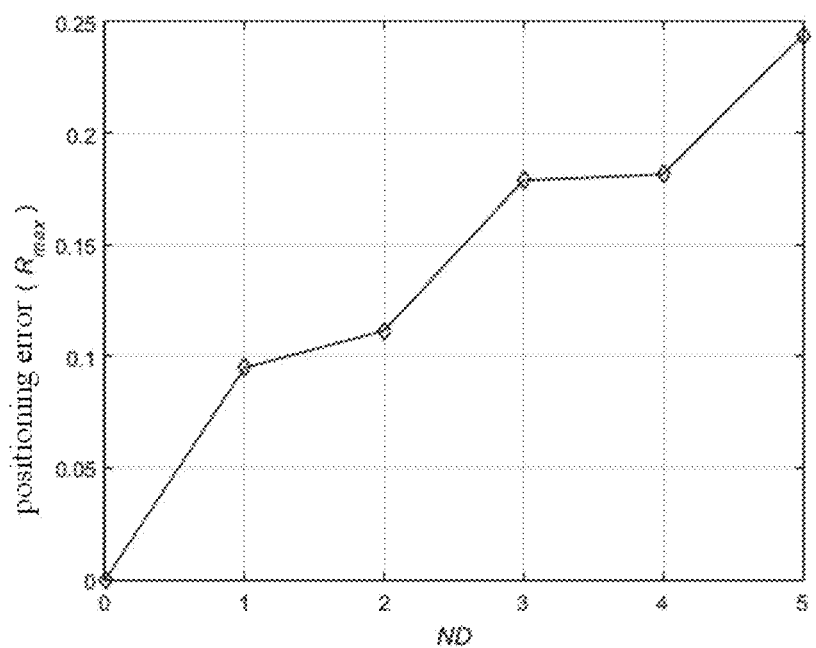
FIG. 14 is a diagram illustrating a relationship between different distance measurement error factors and distance measurement errors.

Environmental noises and irregularities (which reflect the fading caused by obstacles) are paired up into six groups, and the six different groups correspond to different values of the variable ND, that is, the ND represents distance measurement error adjustment factor. The distance measurement errors corresponding to different ND values are shown in FIG. 14. Each of the results is the average of values obtained from one million random experiments, Rmax represents the maximum communication radius, and ND=0 represents an ideal case without a distance measurement error. The average distance measurement error increases with the increase of ND. For example, in a case that the maximum communication radius is 200 meters, the average distance measurement error at ND=5 is about 50 meters.

Figure 15A:
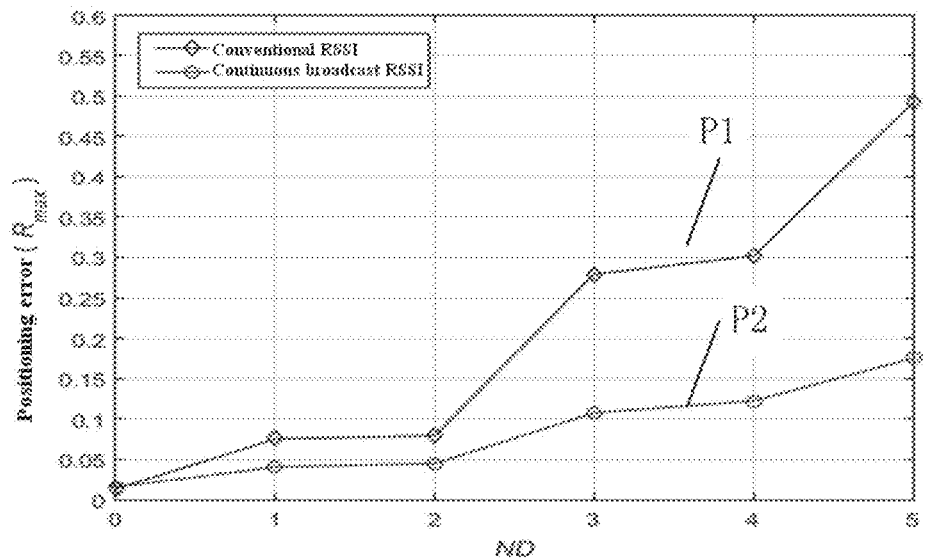
FIG. 15(A)-15(d) illustrate experimental results of the simulation experiment.
Figure 15B:
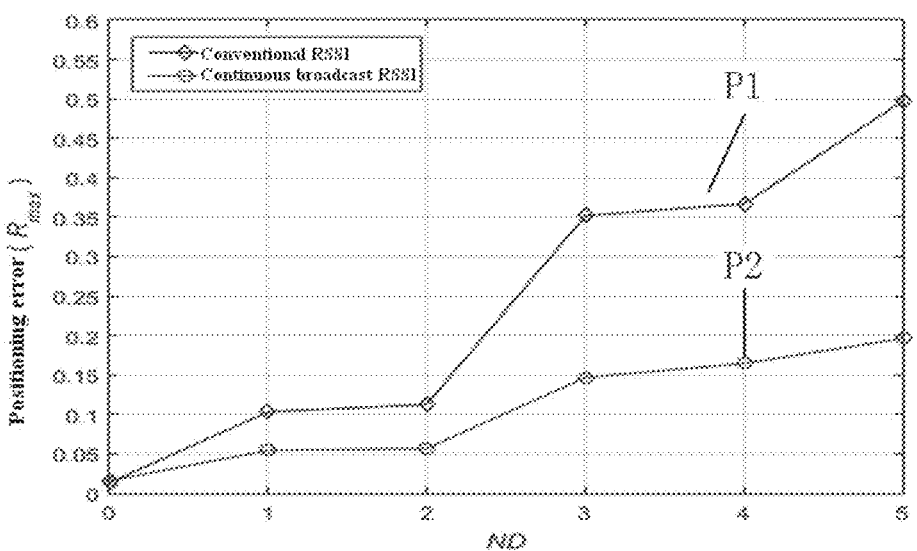
Figure 15C:
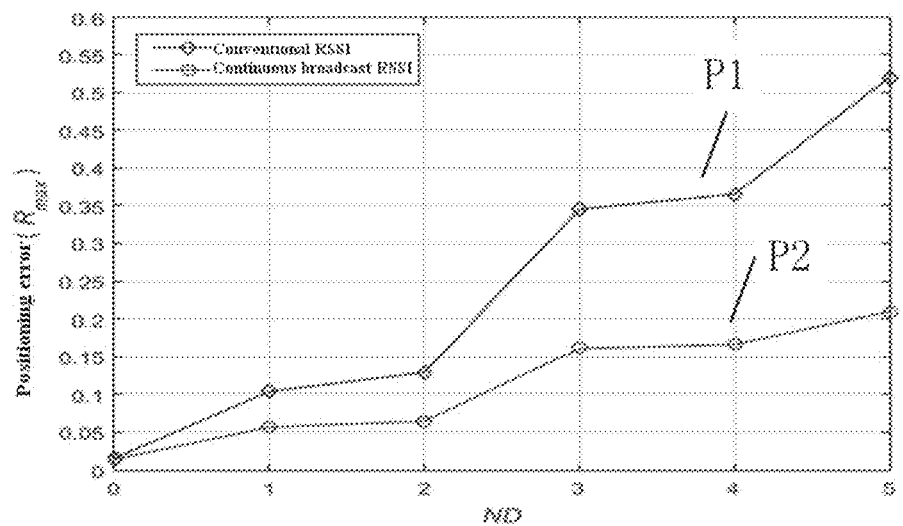
Figure 15D:
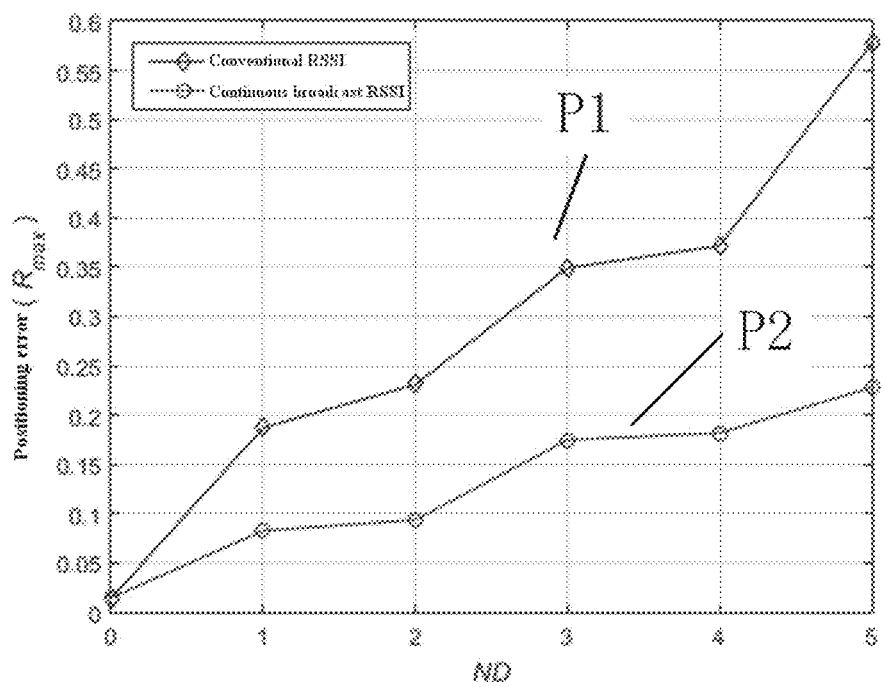

FIGS. 15(*a*)-15(*d*) respectively show experimental results corresponding to different node densities (L1 and L2 have different values) on the lateral road. RSSI distance measurement method is used in the experiment. FIG. 15(*a*) corresponds to a scenario where L1 is 7 and L2 is 13; FIG. 15(*b*)

corresponds to a scenario where L1 is 10 and L2 is 20; FIG. 15(c) corresponds to a scenario where L1 is 15 and L2 is 25; and FIG. 15(d) corresponds to a scenario where L1 is 30 and L2 is 20. The curve P1 in the figures represents a positioning error obtained by using conventional RSSI distance measurement, and the curve P2 represents a positioning error obtained by using the continuous broadcast request RSSI distance measurement provided by the present disclosure. In both methods, the node position is calculated both using the improved two-dimensional logarithmic search algorithm, and each of the results is an average of more than 1000 simulation results. In the simulation, the number of continuous broadcasts is 4 (i.e., n=4), and the minimum distinguishable distance MDD is set to 0.5 meters. Obviously, in a case that there is a distance measurement error (ND>0), with the solution provided by the present disclosure, the positioning error is significantly reduced compared with the conventional distance measurement method, and in the case of the distance measurement error, the positioning error of the continuous broadcast request is lower than the distance measurement error of the conventional distance measurement method by more than 50%.

As can be seen from the above results, with the positioning apparatus according to the present disclosure, the si/e of the search area can be effectively limited, thereby limiting the generation of the mirror-image error.

In a case that there is a static node with a known location, a better effect can be achieved with the solution provided by the present disclosure. This is because the static node is not movable, the information provided by the static node is more referential as compared with that of the mobile node, and the static node is more stable when the distance measurement results are compared.

Compared with the conventional technology, the positioning apparatus and method, the mobile node and the wireless communication device according to the embodiments of the present disclosure have at least the following beneficial effects: the search area in the positioning process can be effectively reduced by sending the distance measurements request multiple times, thereby eliminating the mirror-image error and significantly reducing the positioning error.

Application Examples of a User Equipment

First Application Example

Figure 16:
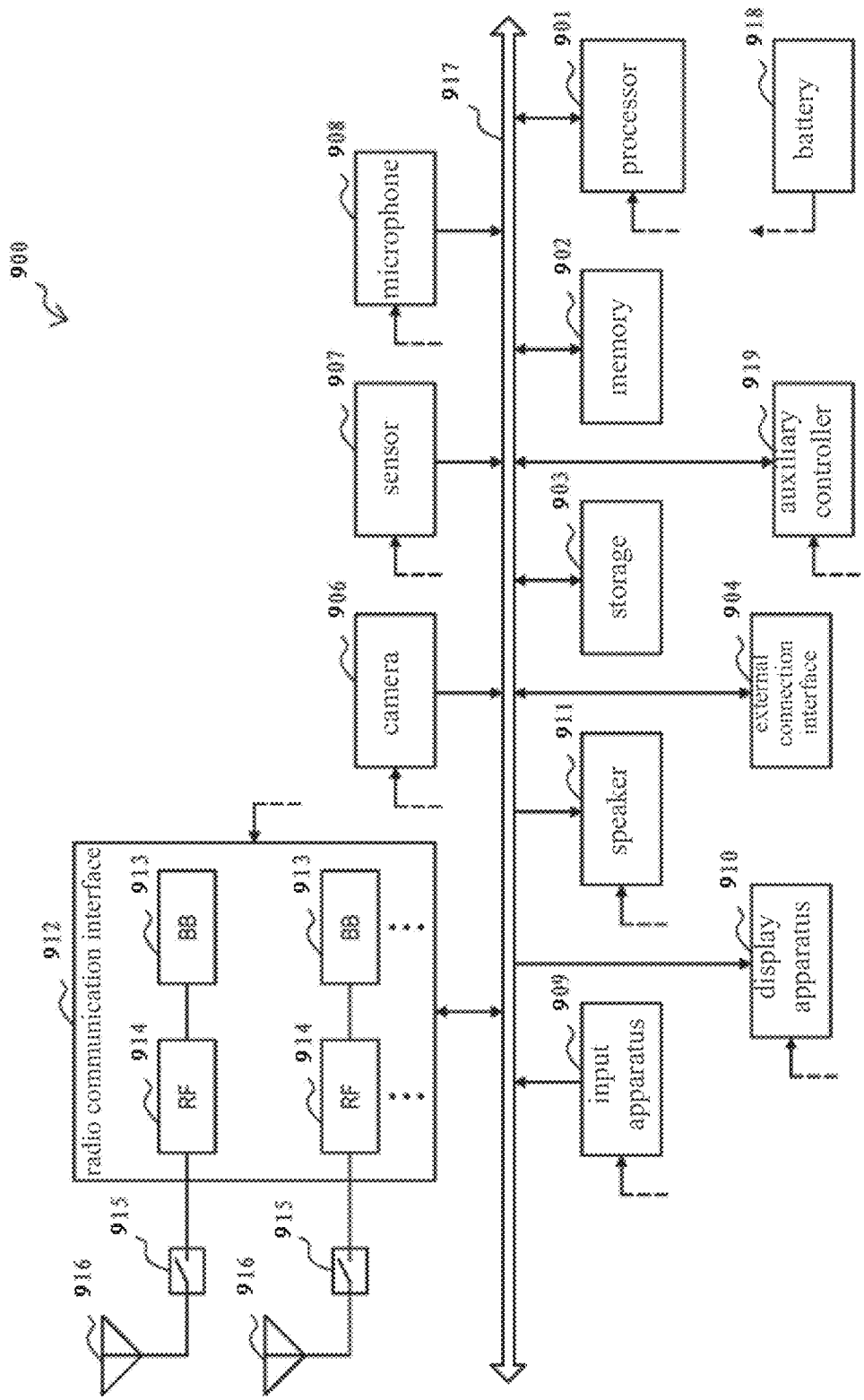
FIG. 16 is a block diagram illustrating an example of a schematic configuration of a smartphone to which the technology of the present disclosure may be applied.

FIG. 16 is a block diagram illustrating an example of an exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display apparatus 910, a speaker 911, a radio communication interface 912, one or more antenna switches 915, one or more antennas 916, a bus 917, a battery 918 and an auxiliary controller 919.

The processor 901 may be, for example, a CPU or a system on a chip (SoC), and controls functions at an application layer and another layer of the smartphone 900. The memory 902 includes a RAM and a ROM, and stores a program that is executed by the processor 901, and data. The storage 903 may include a memory medium, such as a semiconductor memory and a hard disc. The external connection interface 904 is an interface configured to connect an external apparatus (such as a memory card and a universal serial bus (USB) apparatus) to the smart phone 900.

The camera 906 includes an image sensor (such as a charge coupled device (CCD) and a complementary metal oxide semiconductor (CMOS)), and generates a captured image. The sensor 907 may include a group of sensors such as a measurement sensor, a gyro sensor, a geomagnetic sensor, and an acceleration sensor. The microphone 908 converts sound that are inputted to the smartphone 900 to audio signals. The input apparatus 909 includes, for example, a touch sensor configured to detect touch onto a screen of the display apparatus 91), a keypad, a keyboard, a button, or a switch, and receives an operation or information inputted by a user. The display apparatus 910 includes a screen (such as a liquid crystal display (LCD) and an organic light-emitting diode (OLED) display), and displays an output image of the smartphone 900. The speaker 911 converts the audio signal that is outputted from the smartphone 900 to sound.

The radio communication interface 912 supports any cellular communication scheme (such as LET and LTE-Advanced), and performs wireless communication. The radio communication interface 912 may usually include for example a BB processor 913 and an RF circuit 914. The BB processor 913 may perform, for example, coding/decoding, modulation/demodulation and multiplexing/de-multiplexing, and perform various types of signal processing for wireless communications. The RF circuit 914 may include a mixer, a filter and an amplifier for example, and transmits and receives a wireless signal via the antenna 916. The radio communication interface 912 may be one chip module having the BB processor 913 and the RF circuit 914 integrated thereon. The radio communication interface 912 may include multiple BB processors 913 and multiple RF circuits 914, as illustrated in FIG. 16. Although FIG. 16 shows an example in which the radio communication interface 912 includes multiple BB processors 913 and multiple RF circuits 914, the radio communication interface 912 may include a single BB processor 913 or a single RF circuit 914.

In addition, in addition to a cellular communication scheme, the radio communication interface 912 may support another type of wireless communication scheme such as a short-distance wireless communication scheme, a near field communication scheme, and a wireless local area network (LAN) scheme. In that case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna), and is used for the radio communication interface 912 to transmit and receive wireless signals. The smartphone 900 may include the multiple antennas 916, as illustrated in FIG. 16. Although FIG. 16 illustrates an example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input apparatus 909, the display apparatus 910, the speaker 911, the radio communication interface 912, and the auxiliary controller 919 to each other. The battery 918 supplies power to respective blocks of the smartphone 900 shown in FIG. 24 via feeder lines which are partially shown with dashed lines in the figure. The auxiliary controller 919, for example, operates a minimum necessary function of the smart phone 900, for example, in a sleep mode.

In the smartphone 900 shown in FIG. 16, the transceiver unit 31 described with reference to FIG. 7 may be implemented by the radio communication interface 912. At least a portion of the positioning function of the mobile node of which the position is to be determined according to the present disclosure may also be implemented by the processor 901 or the auxiliary controller 919.

Second Application Example

Figure 17:
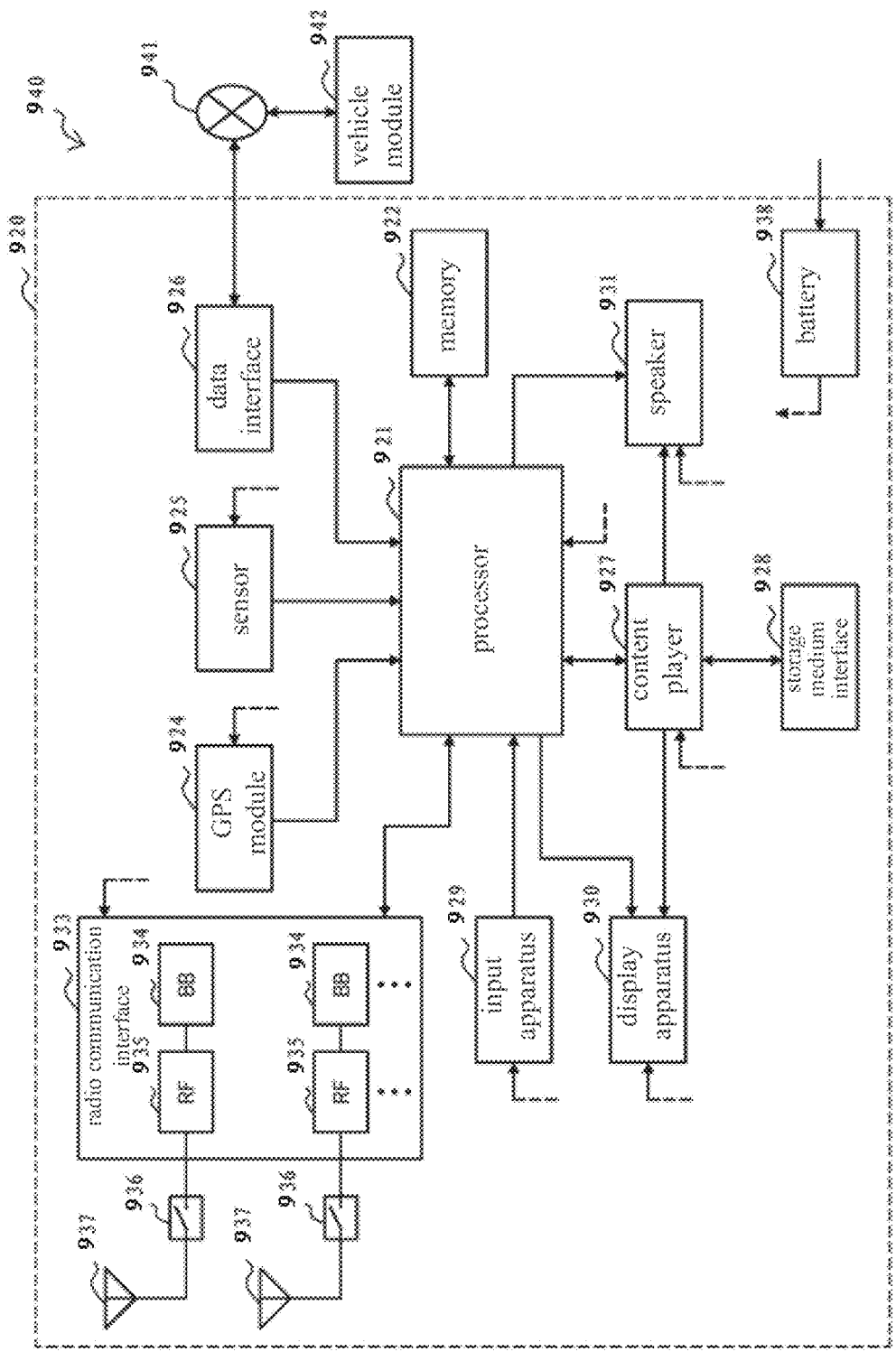
FIG. 17 is a block diagram illustrating an example of a schematic configuration of an car navigation device to which the technology of the present disclosure is applicable.

FIG. 17 is a block diagram illustrating an example of a schematic configuration of a car navigation device 920 in which the technique of the disclosure may be applied. The car navigation device 920 includes a processor 921, a memory 922, a global positioning system (GPS) module 924, a sensor 925, a data interface 926, a content player 927, a storage medium interface 928, an input apparatus 929, a display apparatus 930, a speaker 931, a radio communication interface 933, one or more antenna switches 936, one or more antennas 937 and a battery 938.

The processor 921 may be for example a CPU or a SoC, and controls a navigation function and additional function of the car navigation device 920. The memory 922 includes a RAM and a ROM, and stores data and programs executed by the processor 921.

The GPS module 924 uses GPS signals received from a GPS satellite to measure a position (such as latitude, longitude, and altitude) of the car navigation device 920. The sensor 925 may include a group of sensors such as a gyroscope sensor, a geomagnetic sensor and an air pressure sensor. The data interface 926 is connected to, for example, an in-vehicle network 941 via a terminal that is not shown, and acquires data generated by the vehicle (such as vehicle speed data).

The content player 927 reproduces content stored in a storage medium (such as a CD and a DVD) that is inserted into the storage medium interface 928. The input apparatus 929 includes, for example, a touch sensor configured to detect touch onto a screen of the display apparatus 930, a button, or a switch, and receives an operation or information inputted by a user. The display apparatus 930 includes a screen such as a LCD or an OLED) display, and displays an image of the navigation function or content that is reproduced. The speaker 931 outputs a sound for a navigation function or the reproduced content.

The radio communication interface 933 supports any cellular communication scheme (such as LTE and LTE-advanced) and performs wireless communication. The radio communication interface 933 may usually include for example a BB processor 934 and an RF circuit 935. The BB processor 934 may perform, for example, coding/decoding, modulation/demodulation and multiplexing/de-multiplexing, and perform various types of signal processing for wireless communications. The RF circuit 935 may include a mixer, a filter and an amplifier for example, and transmits and receives wireless signals via the antenna 937. The radio communication interface 933 may be a chip module on which the BB processor 934 and the RF circuit 935 are integrated. As shown in FIG. 17, the radio communication interface 933 may include multiple BB processors 934 and multiple RF circuits 935. Although FIG. 17 shows an example in which the radio communication interface 933 includes multiple BB processors 934 and multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include a BB processor 934 and a RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes one or more antenna elements (such as multiple antenna elements included in a MIMO antenna) and is used by the radio communication interface 933 to transmit and receive wireless signals. As shown in FIG. 17, the car navigation device 920 may include multiple antennas 937. Although FIG. 17 illustrates the example in which the car navigation device 920 includes the multiple antennas 937, the car navigation device 920 may also include a single antenna 937.

Furthermore, the car navigation device 920 may include the antenna 937 for each wireless communication scheme. In this case, the antenna switch 936 may be omitted in the configuration of the car navigation device 920.

The battery 938 supplies power to the blocks of the car navigation device 920 shown in FIG. 17 via feeder lines, which are partially shown with dash lines in the figure. The battery 93h accumulates power supplied from the vehicle.

In the car navigation device 920 shown in FIG. 17, the transceiver unit described with reference to FIG. 7 may be implemented by the radio communication interface 933. At least a portion of the positioning function of the mobile node of which the position is to be determined according to the present disclosure may also be implemented by the processor 921.

The technology of the present disclosure may also be implemented as an in-vehicle system (or a vehicle) 940 including one or more of the car navigation device 920, a vehicle network 941 and a vehicle module 942. The vehicle module 942 generates vehicle data such as vehicle speed, engine speed, and trouble information, and outputs the generated data to the in-vehicle network 941.

The basic principle of the present disclosure has been described above in conjunction with particular embodiments. However, as can be appreciated by those ordinarily skilled in the art, all or any of the steps or components of the method and device according to the disclosure can be implemented in hardware, firmware, software or a combination thereof in any computing device (including a processor, a storage medium) or a network of computing devices by those ordinarily skilled in the art in light of the disclosure of the disclosure and making use of their general circuit designing knowledge or general programming skills.

Moreover, a program product in which machine-readable instruction codes are stored is further provided according to the present disclosure. The instruction code, when read and executed by the machine, performs the method according to the embodiment of the disclosure.

Accordingly, the storage medium for carrying the program product in which the machine readable instruction code is stored is also included in the present disclosure. The storage medium includes, but is not limited to, a soft disk, an optical disk, a magnetic optical disk, a memory card, a memory stick and the like.

In a case where the present disclosure is realized by software or firmware, a program constituting the software is installed in a computer with a dedicated hardware structure (e.g. the general computer 1900 shown in FIG. 18) from a storage medium or network, where the computer is capable of implementing various functions mentioned above according the embodiments of the present disclosure when installed with various programs.

Figure 18:
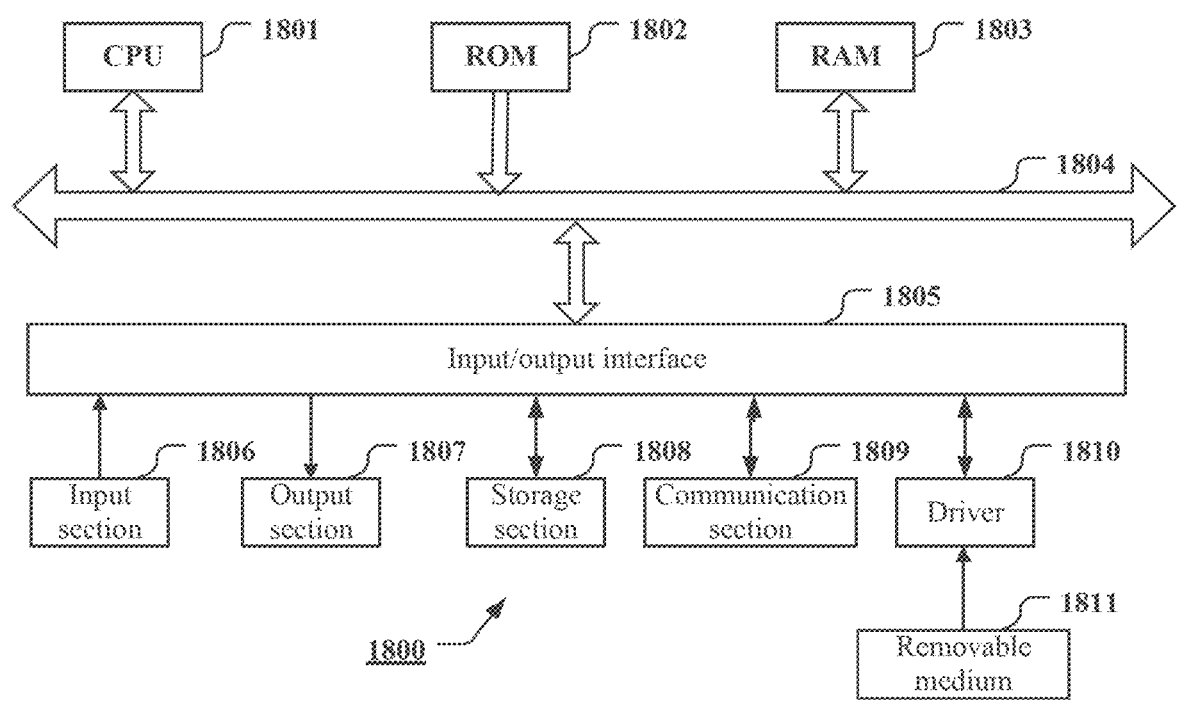
FIG. 18 is an exemplary block diagram illustrating the structure of a general purpose personal computer capable of realizing the method and or apparatus and/or system according to an embodiment of the present disclosure.

In FIG. 18, a central processing unit (CPU) 1801 executes various processing according to the program stored in a read only memory (ROM) 1802 or the program loaded from the storage section 1808 to a random access memory (RAM) 1803. The data for the various processing of the CPU 1801 may be stored in the RAM 1803 as needed. The CPU 1801, the ROM 1802, and the RAM 1803 are connected to each other via a bus 1804. An input/output interface 1805 is also connected to the bus 1804.

The input/output interface 1805 is connected with an input section 1806 (including a keyboard, a mouse), an output section 1807 (including a display such as a Cathode Ray Tube (CRT) and a Liquid Crystal Display (LCD), a loudspeaker), a storage section 1808 (including a hard disk), and a communication section 1809 (including a network interface card such as a LAN card, a modem). The communication section 1809 executes communication processing via a network such as the Internet. A driver 1810 may be connected with the input/output interface 1805 as needed. The removable medium 1811, such as magnetic disk, optical disk, magnetic optical disk and semiconductor memory, may be mounted on the driver 1810 as required, so that the computer program read therefrom is mounted onto the storage section 1808 as required.

In a case of implementation in software, the program consisting of the software is mounted from the network, such as the Internet. or from the storage medium, such as the removable medium 1811.

It is to be understood by those skilled in the art that, this storage medium is not limited to the removable medium 1811 as shown in FIG. 18 in which the program is stored and which is distributed separately from the device to provide the program for the user. The example of the removable medium 1811 includes a magnetic disk (including soft disk (registered trademark)), an optical disk (including compact disk-read only memory (CD-ROM) and Digital Video Disk (DVD)), a magnetic optical disk (including mini disk (MD) (registered trademark)), and a semiconductor memory. Alternatively, the storage medium may be a ROM 1802, a hard disk included in the storage section 1808, etc., in which programs are stored and distributed to the user along with the devices containing them.

To be further noted, in the device, method and system according to the present disclosure, the respective components or steps may be decomposed and/or recombined. These decompositions and/or recombinations shall be regarded as equivalent solutions of the present disclosure. The steps for executing the above processes may be executed naturally in the description order in a chronological order, but is not necessarily to be executed in the chronological order. Some steps may be performed in parallel or independently from each other.

Finally, to be further noted, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Unless expressively limited, the statement "including a . . . " does not exclude the case that other similar elements may exist in the process, the method, the article or the device other than enumerated elements.

Although the embodiments of the disclosure have been described above in detail in connection with the drawings, it is appreciated that the embodiments as described above are merely illustrative but not limitative of the disclosure. Those skilled in the art can make various modifications and variations to the above embodiments without departing from the spirit and scope of the present disclosure. Therefore, the scope of the disclosure is defined merely by the appended claims and their equivalents.

Each of constituent modules and/or units of the above-described device may be configured as software, firmware, hardware, or a combination thereof. Specific means or manners available for configuration are well known to those skilled in the art, and no detailed description will be made herein. In a case of implementing by software or firmware, programs constituting the software are installed to a computer with a dedicated hardware structure from the storage medium or network. The computer can implement various types of functions when installed with various types of programs.

If the foregoing series of processing is implemented by software, a program constituting the software is installed from the network such as the Internet or a storage medium such as the removable medium.

It should be understood by those skilled in the art that the storage medium is not limited to the removable medium in which the program is stored and which is distributed separately from the device so as to provide the program to the user. The removable medium may be for example a magnetic disk (including a floppy disk (registered trademark)), an optical disk (including a Compact Disk Read-Only Memory (CD-ROM) and Digital Video Disk (DVD)), a magneto-optical disk (including minidisk (MD) (registered trademark)) and a semiconductor memory. Alternatively, the storage medium may be a ROM, a hard disk included in the storage section, etc., which has a program stored therein and is distributed to the user along, with an device in which they are incorporated.

A program product storing machine readable instruction codes is further provided in the present disclosure. The method according to the embodiments of the present disclosure can be performed when the instruction codes are read and executed by a machine Accordingly, a storage medium for carrying the program product storing the machine readable instruction codes is further provided according to the present disclosure. The storage medium includes but is not limited to a floppy disc, an optical disc, a magnetic optical disc, a memory card, and a memory stick.

It should also be illustrated that a relation term such as "left" and "right", "first" and "second" in the present disclosure is only used to distinguish one entity or operation from another entity or operation, and does not necessarily require or imply that there is an actual relation or sequence between these entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical elements in the process, method, article, or device that includes said elements.

In the above, the present disclosure is disclosed with the descriptions of the embodiments thereof. However, it should be understood that, various modifications, improvements or equivalents thereof may be designed for the present disclosure by those skilled in the art within the spirit and scope of the appended claims. These modifications, improvements or equivalents should be considered to fall within the protection scope of the present disclosure.

The invention claimed is:

1. A positioning apparatus for positioning a mobile node in a wireless communication system, comprising:
a processing circuitry configured to determine location information of the mobile node based on distance measurement information determined by a neighbor node of the mobile node in response to distance measurement requests sent by the mobile node multiple times and location information of the neighbor node, wherein the distance measurement information comprises distance measurement results determined by the neighbor node for each of the distance measurement requests from the mobile node,
wherein the processing circuitry is further configured to determine a minimum sending interval with which the mobile node sends the distance measurement requests multiple times based on a preset minimum distinguishable distance and a moving speed of the mobile node, so that the mobile node sends the distance measurement requests to the neighbor node with the minimum sending interval multiple times, wherein the minimum distinguishable distance is preset based on a node density of the neighbor nodes of the mobile node.

2. The positioning apparatus according to claim 1, wherein the processing circuitry is configured to determine the location information of the mobile node based on the distance measurement information sent by the neighbor node after the neighbor node receives the last one of the distance measurement requests sent by the mobile node or when it is determined that the mobile node is about to move out of a communication range of the neighbor node.

3. The positioning apparatus according to claim 1, wherein the processing circuitry is configured to: preset the minimum distinguishable distance based on noise and/or fading of a communication environment in which the mobile node locates; and determine the number of times for which the mobile node sends the distance measurement requests based on at least one of the noise and/or fading of the communication environment in which the mobile node locates, the moving speed of the mobile node and the minimum distinguishable distance.

4. The positioning apparatus according to claim 1, the processing circuitry is further configured to classify the neighbor node, and determine a final search area for the mobile node based on classification of the neighbor node and the distance measurement information determined by the neighbor node, to determine the location information of the mobile node based on the final search area and the distance measurement information.

5. The positioning apparatus according to claim 4, wherein the processing circuitry is configured to: determine an initial search area based on the latest one of the distance measurement results in the distance measurement information determined by the neighbor node; and determine a reference line based on a moving direction of the mobile node and a barycenter of the initial search area, and select a static neighbor node in the initial search area as a reference point, to classify the neighbor node based on movement of the neighbor node with respect to the reference point and the reference line.

6. The positioning apparatus according to claim 5, wherein the processing circuitry is configured to classify, based on the movement of the neighbor node with respect to the reference point and the reference line, the neighbor node as:
a neighbor node which is moving towards the reference point and does not move in a direction of the reference line;
a neighbor node which is moving away from the reference point and does not move in a direction of the reference line; or
a static neighbor node or a neighbor node which moves in a direction of the reference line.

7. The positioning apparatus according to claim 6, wherein the processing circuitry is further configured to: determine a movement of the mobile node with respect to the reference point based on the classification of a neighbor node and the distance measurement information determined by the neighbor node; and determine the final search area based on the movement of the mobile node with respect to the reference point.

8. The positioning apparatus according to claim 7, wherein the processing circuitry is further configured to: set a distance measurement interval with which the mobile node sends the distance measurement requests multiple times to be greater than the minimum sending interval, to cause the final search area to be precise.

9. The positioning apparatus according to claim 7, wherein the processing circuitry is configured to: for each of the neighbor nodes, compare two adjacent distance measurement results in the distance measurement information determined by the neighbor node, to determine the movement of the mobile node with respect to the reference point during a time period corresponding to the two adjacent distance measurement results based on the comparison result and the classification of the neighbor node; and perform statistics on determining results corresponding to all of the neighbor nodes, to determine whether the mobile node is moving towards the reference point or moving away from the reference point based on the statistics, so as to determine the final search area.

10. The positioning apparatus according to claim 9, wherein the processing circuitry is configured to:
for the neighbor node which is moving towards the reference point and does not move in the direction of the reference line as well as the static neighbor node or the neighbor node which moves in the direction of the reference line, in a case that the i-th distance measurement result is less than the (i−1)-th distance measurement result determined by the neighbor node, it is determined that the mobile node is moving towards the reference point;
for the neighbor node which is moving away from the reference point and does not move in the direction of the reference line as well as the static neighbor node or the neighbor node which moves in the direction of the reference line, in a case that the i-th distance measurement result is greater than the (i−1)-th distance measurement result determined by the neighbor node, it is determined that the mobile node is moving away from the reference point, wherein i is an integer greater than or equal to 2.

11. The positioning apparatus according to claim 7, wherein the processing circuitry is further configured to: divide the initial search area into a plurality of initial search sub-areas with a dividing line; and determine the initial search sub-area conforming with the movement of the mobile node with respect to the reference point as the final search area based on a determining result about whether the mobile node is moving towards the reference point or moving away from the reference point, wherein the dividing line is a straight line passing through the reference point and perpendicular to the reference line.

12. The positioning apparatus according to claim 1, wherein the processing circuitry is configured to determine the location information of the mobile node based on the distance measurement information determined by the neighbor node of the mobile node in response to the distance measurement requests continuously sent by the mobile node and the location information of the neighbor node.

13. A mobile node in a wireless communication system, wherein the mobile node comprises:
    a communicating unit configured to send distance measurement requests multiple times and receive distance measurement information fed back from a neighbor node of the mobile node in response to the distance measurement requests sent multiple times; and
    a positioning unit configured to determine location information of the mobile node based on the distance measurement information fed back from the neighbor node and location information of the neighbor node, wherein the distance measurement information comprises distance measurement results determined by the neighbor node for each of the distance measurement requests from the mobile node,
    wherein the communicating unit receives the distance measurement information fed back from the neighbor node after the neighbor node receives the last one of the distance measurement requests sent by the communicating unit or when it is determined that the mobile node is about to move out of a communication range of the neighbor node, the distance measurement information comprises the distance measurement results determined by the neighbor node for each of the distance measurement requests.

14. The mobile node according to claim 13, wherein the communicating unit is further configured to: send a node density request for requesting node density information of neighbor nodes of the mobile node before the communicating unit sends the distance measurement requests; and receive the node density information fed back from the neighbor node in response to the node density request, so that the positioning unit presets a minimum distinguishable distance based on the node density information and determines, based on the minimum distinguishable distance, a minimum sending interval with which the mobile node sends the distance measurement requests.

15. The mobile node according to claim 13, wherein the mobile node is a mobile terminal, and the neighbor node is at least one of a base station serving the mobile node, another mobile terminal other than the mobile terminal serving as the mobile node, and a road side unit RSU.

16. A wireless communication device in a wireless communication system, wherein the wireless communication device comprises:
    a communicating unit configured to receive distance measurement requests sent by a mobile node multiple times and send distance measurement information determined in response to the distance measurement requests and location information of the wireless communication device to the mobile node, so that the mobile node determines location information of the mobile node based on the distance measurement information and the location information of the wireless communication device, wherein the distance measurement information comprises distance measurement results determined by the wireless communication device for each of the distance measurement requests,
    wherein the communicating unit is further configured to receive a node density request for requesting node density information sent by the mobile node and send the node density information to the mobile node in response to the node density request, so that the mobile node presets a minimum distinguishable distance based on the node density information from the wireless communication device and determines, based on the minimum distinguishable distance, a minimum sending interval with which the mobile node sends the distance measurement requests.

17. The wireless communication device according to claim 16, wherein the communicating unit is further configured to send the distance measurement information after the wireless communication device receives the last one of the distance measurement requests sent by the mobile node or when it is determined that the mobile node is about to move out of a communication range of the wireless communication device.

* * * * *